Dec. 27, 1960 J. C. McALVAY 2,966,118

FUEL UNIT

Filed Oct. 8, 1956 8 Sheets-Sheet 1

INVENTOR

JOHN C. McALVAY

BY Mason, Kolehmainen, Rathburn and Wyss.

ATTORNEYS

Dec. 27, 1960 J. C. McALVAY 2,966,118

FUEL UNIT

Filed Oct. 8, 1956 8 Sheets-Sheet 2

INVENTOR

JOHN C. McALVAY

BY Mason, Kolehmainen, Rathburn and Wyss.

ATTORNEYS

Dec. 27, 1960 J. C. McALVAY 2,966,118

FUEL UNIT

Filed Oct. 8, 1956 8 Sheets-Sheet 3

INVENTOR

JOHN C. McALVAY

BY

Mason, Kolehmainen, Rathburn and Wyss.

ATTORNEYS

Dec. 27, 1960 J. C. McALVAY 2,966,118

FUEL UNIT

Filed Oct. 8, 1956 8 Sheets-Sheet 4

INVENTOR

JOHN C. McALVAY

BY

Mason, Kolehmainen, Rathburn and Wyss.

ATTORNEYS

INVENTOR
JOHN C. McALVAY

BY
Mason, Kolehmainen, Rathburn and Wyss.
ATTORNEYS

Inventor
JOHN C. McALVAY
by
Mason, Kolehmainen, Rathburn and Wyss.
Attorneys

Dec. 27, 1960 J. C. McALVAY 2,966,118

FUEL UNIT

Filed Oct. 8, 1956 8 Sheets-Sheet 7

INVENTOR

JOHN C. McALVAY

BY

Mason, Kolehmainen, Rathburn and Wyss.

ATTORNEYS

Dec. 27, 1960 J. C. McALVAY 2,966,118

FUEL UNIT

Filed Oct. 8, 1956 8 Sheets-Sheet 8

INVENTOR

JOHN C. McALVAY

BY

Mason, Kolehmainen, Rathburn and Wyss

ATTORNEYS 2,966,118

FUEL UNIT

John C. McAlvay, Racine, Wis., assignor to Webster Electric Company, Racine, Wis., a corporation of Delaware Filed Oct. 8, 1956, Ser. No. 614,706

30 Claims. (Cl. 103—3)

This invention relates generally to fuel units and is particularly concerned with units of this nature suitable for supplying oil under predetermined pressure to an oil burner.

Such units may be utilized in a wide variety of installations which may require that the pump be driven by a source rotating in either a clockwise or a counterclockwise direction. Another possible requirement may be as to the location of the inlet to the pump and the location of the discharge or outlet from the pump, due to the fact that certain manufacturers prefer that the inlet be located on the right-hand side of the pump, while others prefer it on the left-hand side, while the same is true of the outlet. This makes a total of eight possible requirements with respect to the arrangement of the parts of the unit, since these customers may require either right-hand rotation or left-hand rotation, with the inlet either on the right or the left and with the outlet either on the right or on the left of the pump housing.

In addition to the above requirements, it is also desirable to be able to convert the pump from a single-stage pumping device to a double-stage pumping device by replacing or adding a minimum number of additional parts. Moreover, in either the single-stage or double-stage devices, it is desirable to provide a pump which may be utilized with a single pipe system or a two-pipe return system with reference to the excess of liquid fuel discharged from the pump.

Accordingly, the primary object of the present invention is to provide a fuel pump which satisfies all of the aforementioned requirements.

Another object of the invention is the provision of an improved pump having elements which may be rearranged so that the pump is operated either by clockwise or counterclockwise rotation of its shaft, without interchanging the positions of the outlet and inlet ports.

A further object of the invention is to provide an improved pump having elements which may be rearranged to change the outlet from the right-hand side of the pump to the left-hand side of the pump without changing either the direction of drive of the pump shaft or the position of the inlet connection.

Another object of the invention is the provision of an improved pump which is simple and sturdy in construction, while at the same time employing a minimum number of parts to facilitate low cost manufacture.

A still further object of the present invention is the provision of an improved pump which involves the manufacture of a minimum number of parts, while at the same time being capable of satisfying all of the possible situations with regard to the direction of rotation of the pump shaft or the location of the inlet and outlet ports that may be required by pump purchasers.

Another object of the invention is the provision of an improved pump which is adapted to be disassembled with a minimum amount of labor to facilitate the inspection, repair or rearrangement of the component parts of the pumping apparatus.

It is also an object of the present invention to provide an improved pump structure in which the parts of the pump are built up by a series of separate plates which may be accurately machined and produced in large volume at low cost and may be constructed in such manner that the pump will operate for long periods of time without likelihood of leakage or change of dimensions due to wear, these plates being capable of being manipulated so that the pump will operate with either right-hand or left-hand rotation and the outlet may be located either to the right or on the left of the pump housing.

It is a further object of the invention to provide an improved fuel unit which is simple in design and which is constructed of a minimum number of small parts so arranged that they are readily accessible for inspection, service and adjustment in the field without requiring the entire unit to be returned to the factory for service or repair.

It is likewise an object of the present invention to provide a new and improved pressure regulating apparatus for use with a fuel unit in controlling the by-pass of fluid back to the source of supply in order to insure delivery of fluid to an oil burner under controllable predetermined pressure.

An additional object of the present invention is the provision of an improved fuel unit having a novel pressure regulating mechanism composed of component elements which may be readily disassembled and rearranged to facilitate a change in the flow of outlet fluid from one side of the pump housing to the other.

Other objects and advantages of the present invention will become apparent from the following description of illustrative embodiments thereof, in the course of which reference is had to the accompanying drawings wherein.

Figures 1, 2:
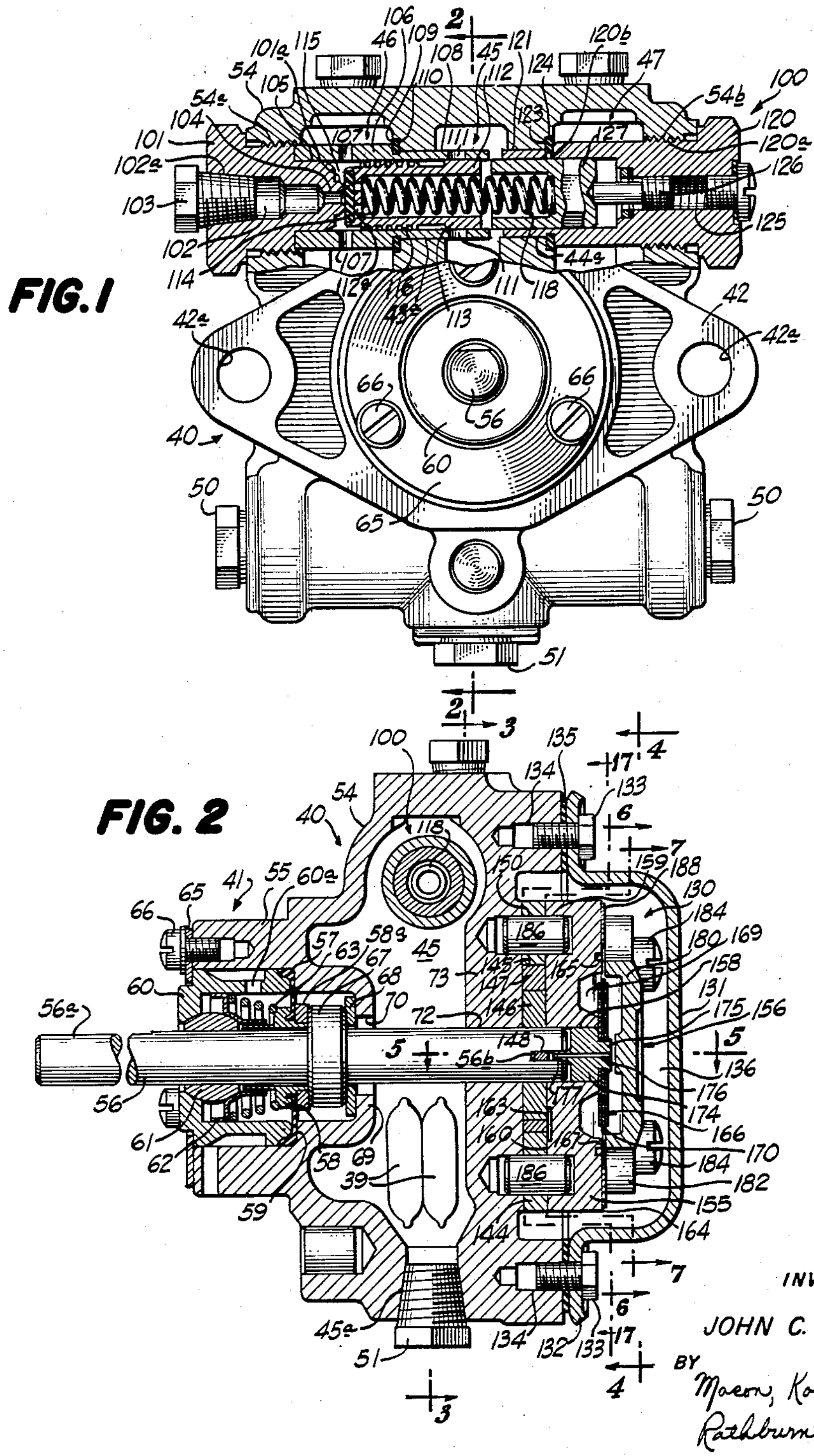
Fig. 1 is a front elevational view, partly broken away and partly in section, showing the fuel unit of the present invention and particularly illustrating the pressure regulator for controlling the pressure of the fluid delivered to the pump outlet.
Fig. 2 is a sectional view taken along a line substantially corresponding to the line 2—2 in Fig. 1, assuming, of course, that the entire fuel unit had been shown in Fig. 1.
Figures 6, 7, 8, 9:
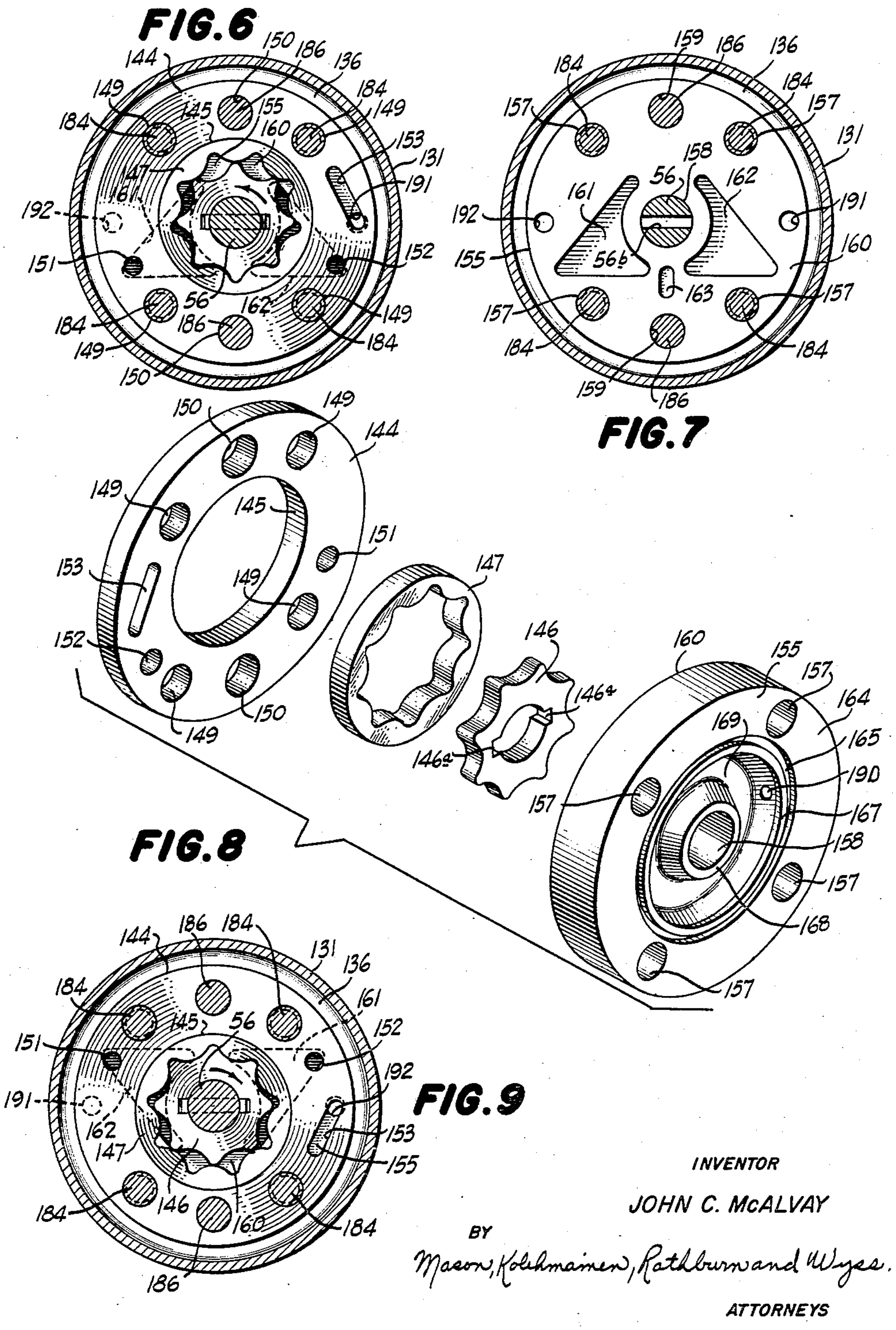
Figure 10:
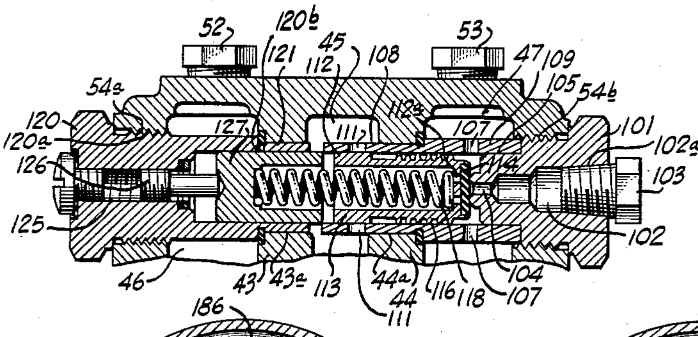
Figure 11:
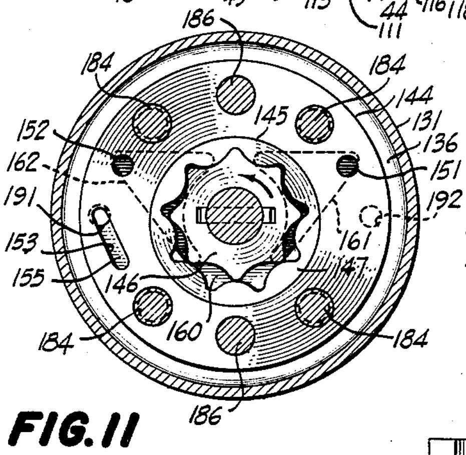
Figure 12:
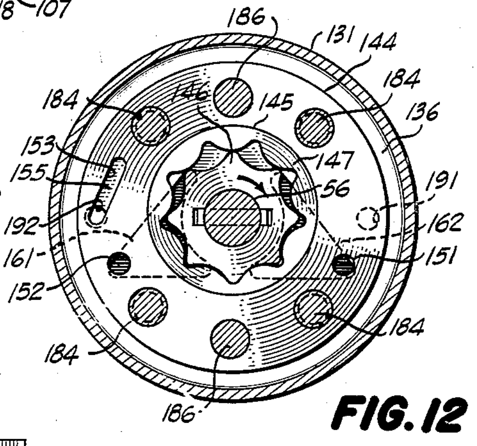
Figure 18:
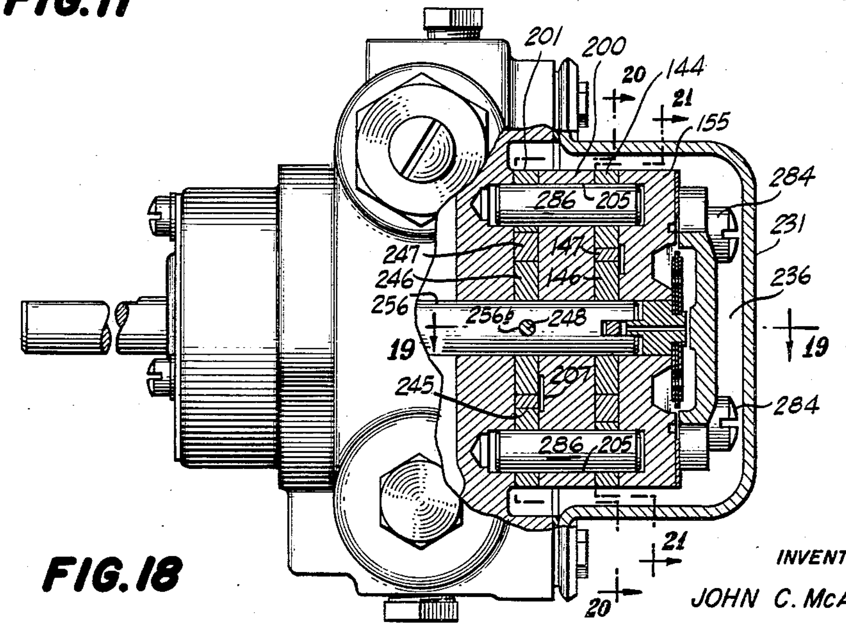
Figures 13, 14, 15, 16:
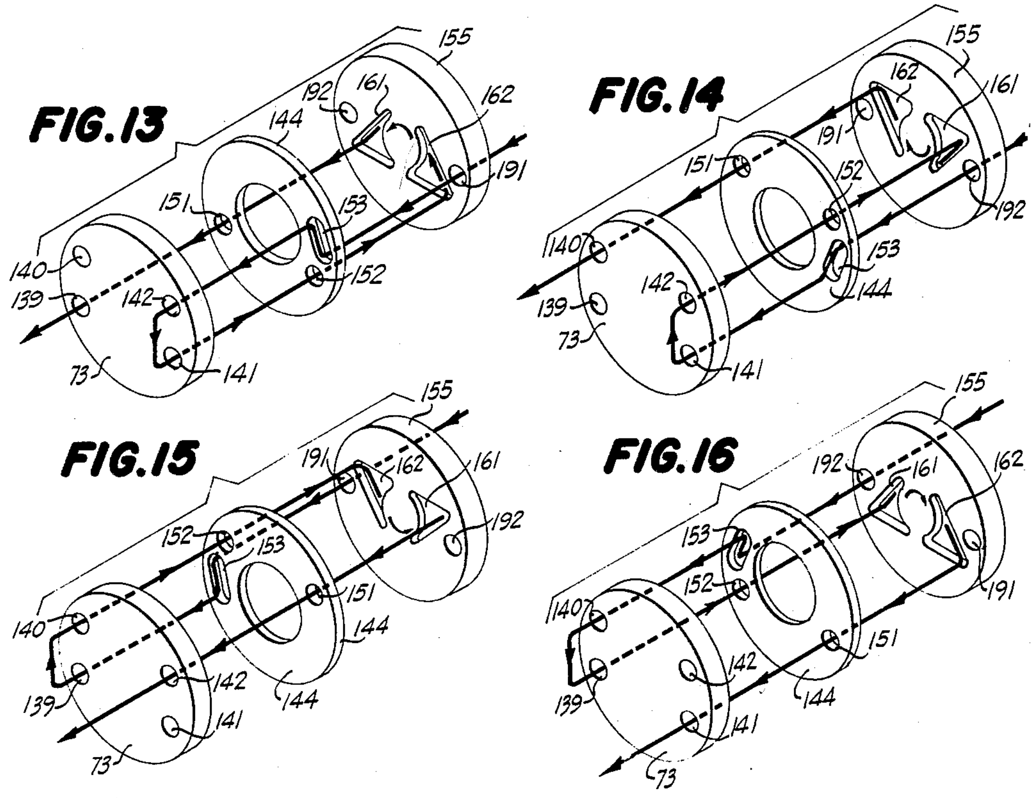
Figure 29:
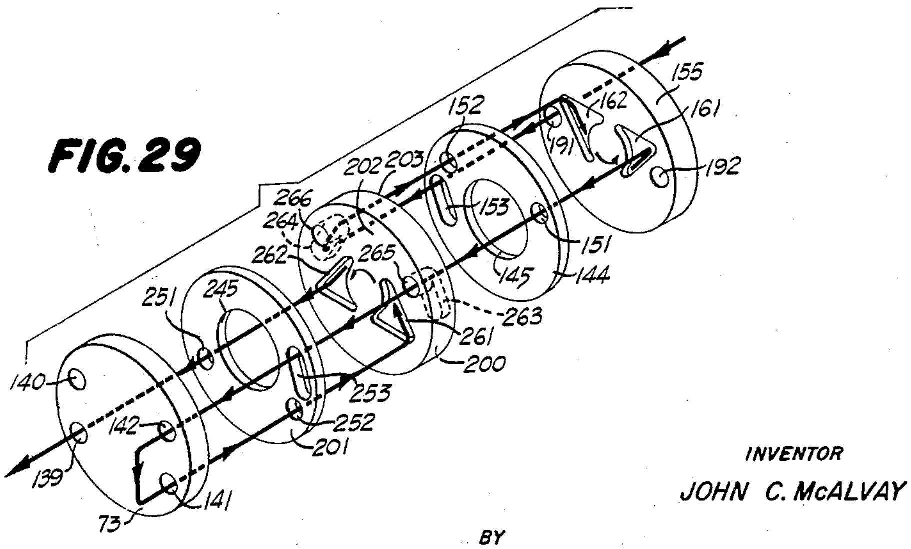
Figures 17, 30, 31, 32:
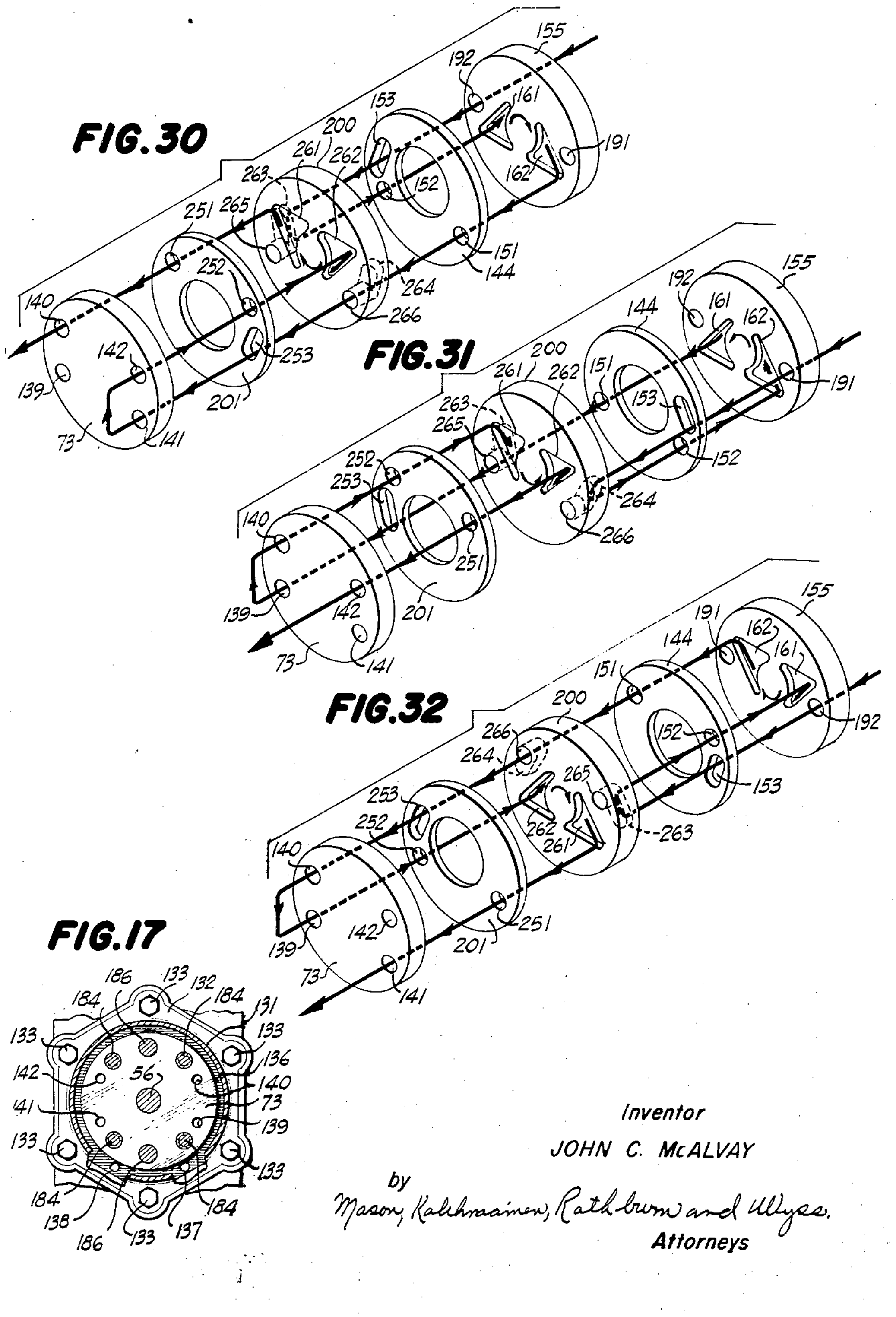
Figures 19, 20:
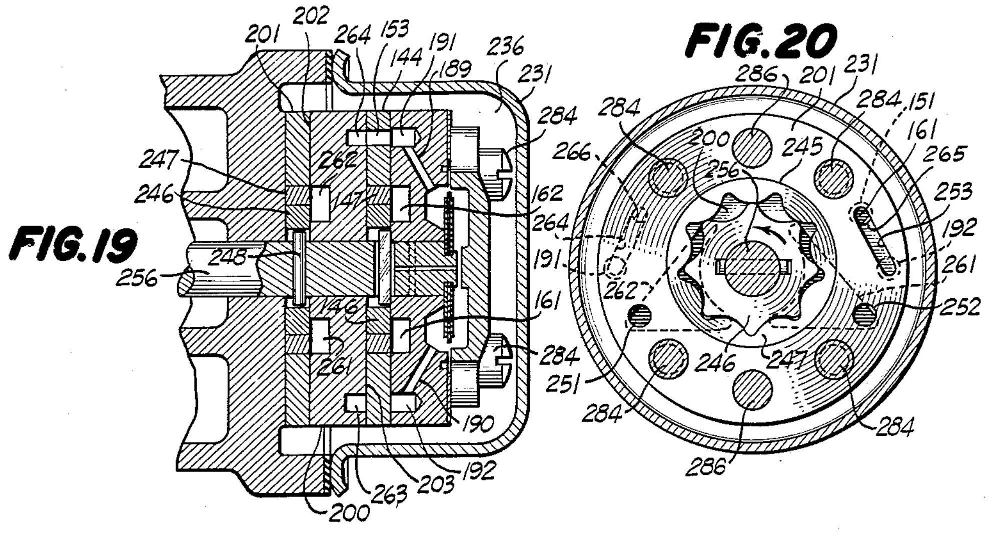
Figures 22, 23:
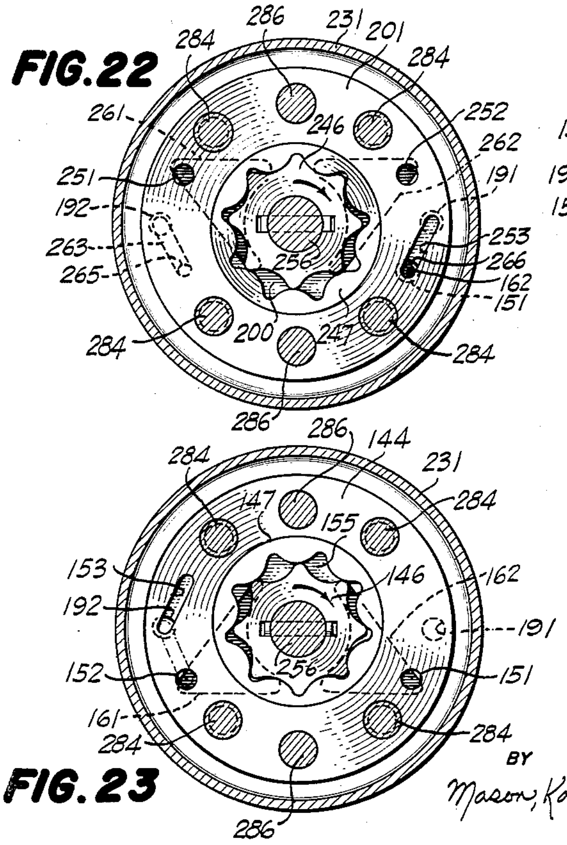
Figure 21:
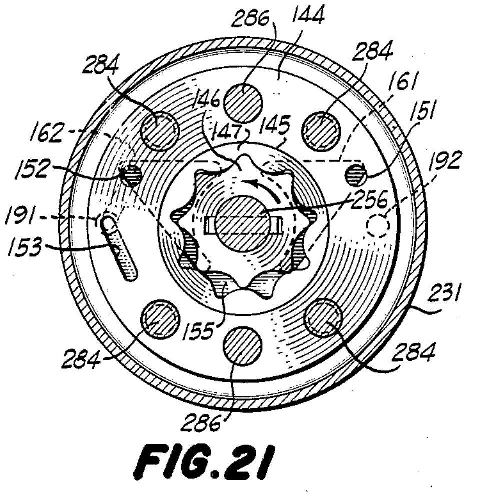
Figure 24:
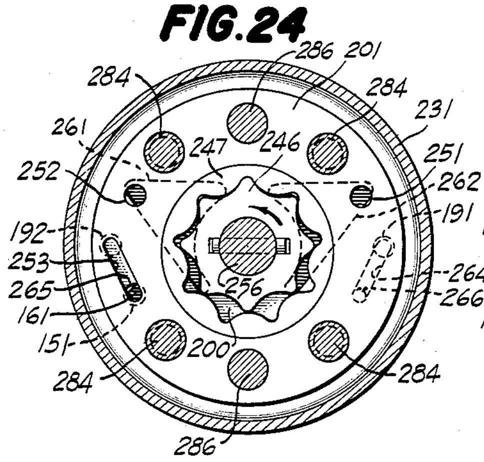
Figure 25:
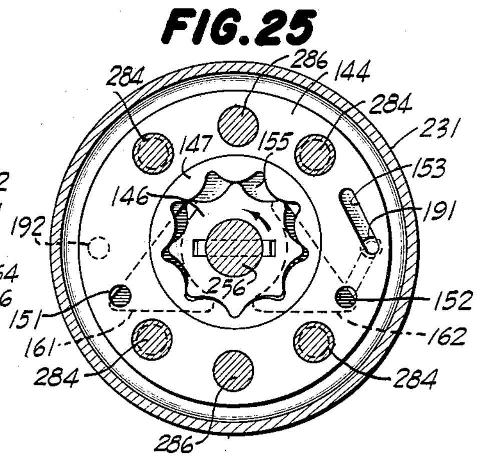
Figure 26:
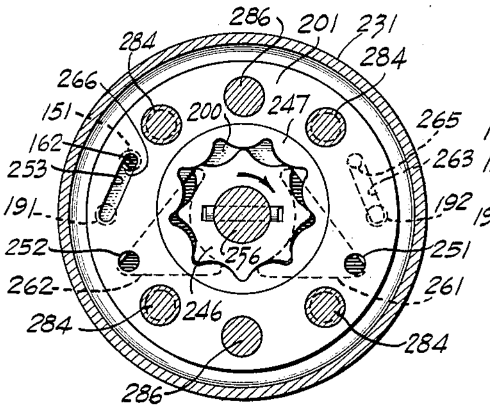
Figure 27:
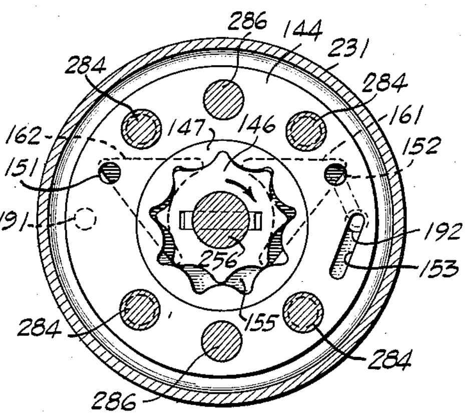
Figure 28:
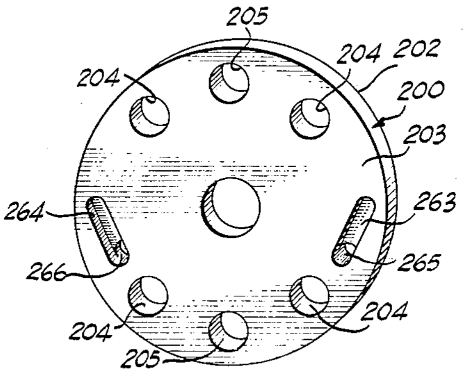
Figure 4A:
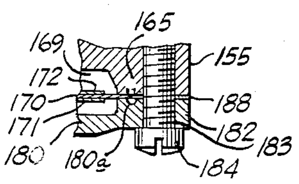
Fig. 4A is a fragmentary sectional view taken along a line substantially corresponding to line 4A—4A in Fig. 4.

Fig. 6 is a sectional view taken along a line substantially corresponding to the line 6—6 in Fig. 2, assuming that the latter shows the entire unit, and showing particularly the details of the pump plate employed in the single-stage fuel unit and illustrating the position of this plate when assembled for counterclockwise rotation of the pump shaft and delivery of fluid to an outlet disposed on the left-hand side of the pump housing;

Fig. 7 is a sectional view taken along a line substantially corresponding to the line 7—7 in Fig. 2, assuming that the latter shows the entire unit, and showing particularly the front face of the cover plate for the single-stage fuel unit when assembled for counterclockwise shaft rotation and delivery to the left-hand outlet;

Fig. 8 is an exploded view showing the pumping gears, the pump plate and the cover plate of the single-stage fuel unit illustrated in Figs. 2 to 7;

Fig. 9 is a sectional view similar to Fig. 6 shown with the cover plate and the pump plate arranged for clockwise rotation of the pump shaft and for delivery of fluid to an outlet disposed on the left-hand side of the pump housing, the cover plate having been rotated through an angle of 180° about the axis of the drive shaft from the position shown in Fig. 7 and the pump plate having been rotated through an angle of 180° about a horizontal axis extending normal to the axis of the pump shaft from the position shown in Fig. 6;

Fig. 10 is a fragmentary sectional view illustrating the pressure regulator mechanism rearranged to deliver outlet fluid to the right-hand side of the pump housing when appropriate changes are made in the positions of the pump and cover plates;

Fig. 11 is a view similar to Fig. 6 but illustrating the arrangement of the pump and cover plates for counterclockwise rotation of the pump shaft and delivery of fluid to an outlet on the right-hand side of the housing, the cover plate having been rotated through an angle of 180° about the axis of the pump shaft from the position shown in Fig. 7 and the pump plate having likewise been rotated through an angle of 180° about the axis of the pump shaft from the position shown in Fig. 6;

Fig. 12 is a sectional view similar to Fig. 6 illustrating the assembly of the pump and cover plates as arranged for clockwise drive of the pump shaft and for delivering fluid to an outlet on the right-hand side of the pump housing with the cover plate occupying the same position that it did in Fig. 7 and the pump plate being rotated through an angle of 180° about a vertical axis passing normal to the axis of the drive shaft from the position shown in Fig. 6;

Fig. 13 is a diagrammatic view showing the pump plate, the cover plate and the face of the pump housing in spaced apart relationship with respect to each other and with respect to the pump housing and illustrating the fluid flow through the various ports and passages when the unit is assembled for counterclockwise rotation of the pump shaft and for delivery of outlet fluid to an outlet on the left-hand side of the pump housing;

Fig. 14 is a view similar to Fig. 13 but illustrating the fluid flow when the unit is assembled for clockwise rotation of the pump shaft and for delivery of fluid to an outlet on the left-hand side of the pump housing;

Fig. 15 is a view similar to Fig. 13 but illustrating the fluid flow when the unit is assembled for counterclockwise rotation of the pump shaft and delivery of fluid to an outlet on the right-hand side of the housing;

Fig. 16 is a view similar to Fig. 13, illustrating the fluid flow when the unit is assembled for clockwise rotation of the pump shaft and delivery of fluid to an outlet on the right-hand side of the pump housing;

Fig. 17 is a reduced, fragmentary view looking in the direction of the arrows 17—17 in Fig. 2 and illustrating the port arrangement in the face of the pump housing adjacent the pumping gears;

Fig. 18 is a side elevational view, partly broken away and partially in section, illustrating a two-stage pumping device characterized by the features of the present invention;

Fig. 19 is a fragmentary sectional view taken along a line substantially corresponding to the line 19—19 in Fig. 18, assuming, of course, that the entire fuel unit had been shown in Fig. 18;

Figs. 20 and 21 are sectional views taken along the lines 20—20 and 21—21, respectively, in Fig. 18, assuming that the latter shows the entire unit, and illustrating respectively the second and first stages of the two-stage pumping device when assembled for counterclockwise rotation and delivery of fluid to an outlet located on the left-hand side of the pump housing;

Figs. 22 and 23 are views similar to Figs. 20 and 21, respectively, illustrating the arrangement of plates in the second and first pumping stages when the unit is arranged for clockwise rotation of the pump shaft and for delivery of fluid to an outlet on the left-hand side of the housing;

Figs. 24 and 25 are views respectively similar to Figs. 20 and 21, illustrating the second and first pumping stages when the unit is assembled for counterclockwise rotation of the pumping shaft and for delivery of fluid to an outlet on the right-hand side of the pump housing;

Figs. 26 and 27 are sectional views respectively similar to Figs. 20 and 21, illustrating the second and first pumping stages when the unit is assembled for clockwise rotation of the pump shaft and for delivery of fluid to an outlet on the right-hand side of the pump housing;

Fig. 28 is a perspecttive view showing the center control plate employed in the two-stage pumping device shown in Fig. 18;

Fig. 29 is a diagrammatic view illustrating the position of and the fluid flow through the two-stage pumping device when assembled as illustrated in Figs. 20 and 21 for counterclockwise rotation of the drive shaft and delivery of fluid to an outlet on the left-hand side of the housing;

Fig. 30 is a view similar to Fig. 29, but illustrating the arrangement of the plates when assembled as shown in Figs. 22 and 23 for clockwise drive and for delivery of fluid to an outlet on the left-hand side of the housing;

Fig. 31 is a view similar to Fig. 29 but illustrating the assembly of plates as shown in Figs. 24 and 25 for delivering fluid to an outlet on the right-hand side of the pump housing during counterclockwise rotation of the pump shaft; and Fig. 32 is a view similar to Fig. 29 illustrating the assembly of plates as illustrated in Figs. 26 and 27 when the pump shaft is driven in a clockwise direction and outlet fluid is directed to the right-hand side of the pump housing.

Referring now to the drawings, and more particularly to Figs. 1 to 5, the present fuel unit for oil burners preferably comprises a pump housing, indicated generally by the numeral 40, containing a bearing and shaft sealing unit 41, a pressure regulator assembly 100 and a pumping unit 130, cooperatively related to accomplish the objects described above. The pump housing 40 is in the form of a casting which includes a mounting plate 42, best shown in Figs. 1 and 4 of the drawings, and having spaced apart mounting holes **42*a*** for receiving bolts or other fastening devices by means of which the fuel unit may be mounted upon suitable supporting structure of the oil burner. In the ensuing description, discussion of clockwise or counterclockwise rotation of the various elements or of disposition of the component parts on the left-hand side or the right-hand side of the pump is taken with reference to Fig. 1, that is, as seen looking at the forward end of the pump.

Figure 3:
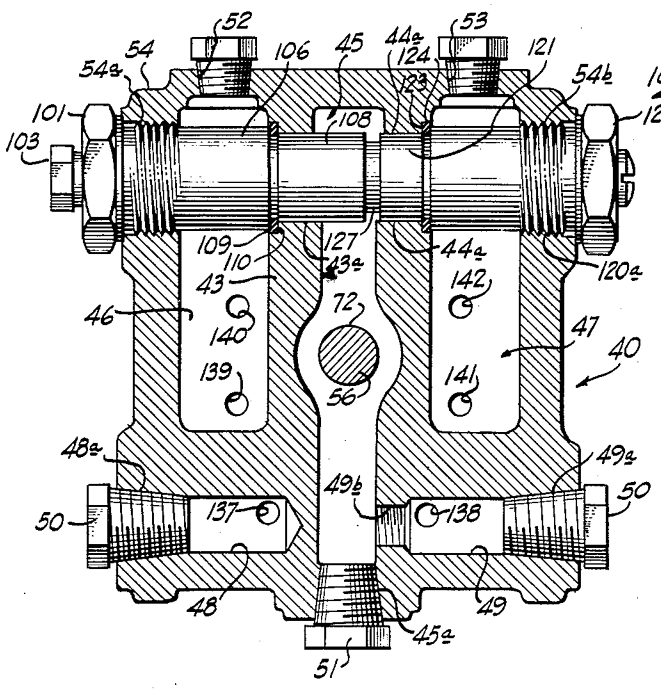
Fig. 3 is a sectional view taken along a line substantially corresponding to the line 3—3 in Fig. 2, assuming again that the entire fuel unit had been shown in Fig. 2.

As illustrated in Fig. 3, the pump housing 40 includes a pair of vertical walls or partitions 43 and 44, for effectively dividing the interior of the housing into a by-pass fluid reservoir 45 and a pair of chambers 46 and 47, all effectively isolated from each other. The housing further includes a pair of bores 48 and 49 extending towards each other from opposite sides of the housing and providing spaced apart fluid inlet chambers each having its end portion internally threaded as indicated at **48*a* and 49*a*, respectively, in order to accommodate one of the threaded plugs 50 illustrated in Fig. 3. During shipment of the unit, both of the plugs 50 may be threaded into the portions 48*a* and 49*a* to prevent dirt and other foreign particles from entering the inlet chambers. It will be understood that, when the unit is installed, only one of these plugs is employed to seal off its associated inlet chamber, with the remaining chamber being connected through a suitable conduit to a fluid tank or reservoir in conventional manner. In this manner, the fluid inlet from the tank may be connected either to the left-hand side of the pump housing or to the right-hand side, as viewed in Fig. 3, and the other inlet chamber may be sealed by the plug 50**.

The lower end of the by-pass reservoir 45 also includes an internally threaded portion 45*a* for receiving either a sealing plug 51, when a one-pipe system is employed, or for receiving a suitable conduit leading to the tank or reservoir when a two-pipe system is employed. When a one-pipe system is employed, the by-pass reservoir 45 is connected through a threaded opening 49*b* to the inlet chamber 49, thus providing for by-pass of excess fluid directly to the inlet. When a two-pipe system is used the opening 49*b* is closed by a sealing plug (not shown in the drawings) which may be inserted through the chamber 49 by removing plug 50 and may be threaded into the opening 49*b* by use of a suitable tool. Under these conditions excess fluid from the by-pass reservoir 45 flows to the sump through the conduit connected to the opening 45*a*. A plurality of energy-absorbing pillows 39, which remove undesired pulsations from a stream of fluid, are preferably disposed within the by-pass reservoir 45. These pillows are described in detail in applicant's copending application Serial No. 483,023, filed January 20, 1955, now abandoned, and, hence, will not be described in detail. Outlets 52 and 53, leading from the chambers 46 and 47, respectively, may be employed for the connection of an outlet pressure gauge to check the operation of the pump whenever desired. In the absence of the pressure gauge, the outlets 52 and 53 are, of course, sealed by the closure plugs illustrated in Figs. 1 and 3.

As previously indicated, the housing 40 also includes a cylindrical portion 54 having threaded openings 54*a* and 54*b* at the opposed ends thereof for accommodating the pressure regulator 100, the component parts of which are described more fully below. The pressure regulator, as illustrated in Fig. 3, extends from one side of the housing 40 to the other and is exposed to the fluid chambers 46 and 47 and to the by-pass reservoir 45.

As illustrated in Fig. 2, the housing 40 further includes a centrally disposed and forwardly extending cylindrical portion 55 containing the bearing and shaft sealing unit 41 referred to above. The latter unit functions to journal a pump shaft 56 having a forwardly protruding free end 56*a*, which is adapted to be driven either in a clockwise direction or a counterclockwise direction by means of any suitable drive mechanism, such as an electric motor associated with the oil burner. The bearing and shaft sealing unit 41 is of conventional construction and includes a flexible diaphragm 57 which is secured to a sleeve 58 slidably mounted upon the shaft 56 by a ring 58*a*. The ring has its right-hand surface optically finished so as to provide a good seal surface in engagement with the rotary collar 67 on shaft 56. The outer peripheral portion of the diaphragm 57 is seated on its rear face against an annular shoulder 59 extending inwardly from the cylindrical portion 55 of the pump housing and on its front face engages the inner end of a hollow bearing cup or clamping ring 60 mounted in a recess in portion 55 of the valve body. The cup 60 carries a sleeve bearing 61 journaling the shaft 56, together with a bearing retaining member 62, which is drive fitted into the cup 60 and holds the bearing 61 in position. One or more openings 60*a* may be provided to permit flow of leakage fluid from within the cup 60. A coil spring 63 interposed between the member 62 and the sleeve 58 urges the diaphragm sleeve assembly to the right to provide fluid sealing engagement between ring 58*a* and collar 67. The bearing and shaft sealing unit 41 is retained within the cylindrical portion 55 of the housing by means of an annular retaining plate 65 which is secured to the cylindrical portion 55 by means of a plurality of spaced apart machine screws 66. The retaining plate 65 is dimensioned to overlap and engage the front end of the bearing cup 60 and, hence, provides a stop for resisting axial movement of the cup due to the action of the coil spring 63.

To hold the shaft 56 in position within the housing, there is provided a thrust washer 68 seated against a shoulder portion 69 extending inwardly of the recess in the cylindrical portion 55 of the housing. The spring 63 forces the shaft to the right as viewed in Fig. 2 through engagement of the sleeve 58 and ring 58*a* with the collar 67. The rearwardly disposed end of the shaft 56, of course, extends through an opening 70 in the shoulder portion 69, through the by-pass reservoir 45 and through a central opening 72 in the rear wall 73 of the pump housing. The end of the shaft 56 protruding beyond the external face of the wall 73 functions to drive the elements of the pumping unit 130 in a manner described more fully hereinafter.

Referring now to Figs. 1 and 3 for a description of the pressure regulator mechanism 100, which functions to control the pressure of the fluid delivered at the outlet of the pump and to by-pass excess fluid to the by-pass reservoir 45, it will be observed that this mechanism includes an outlet plug 101 having a central opening 102 therein through which fluid may be delivered to a conduit leading to the nozzle of the oil burner. The plug 101 is adapted to be selectively inserted into either one of the openings 54*a* or 54*b*. Thus, when outlet fluid is to be delivered to the left-hand side of the pump housing, the plug 101 is threaded into opening 54*a*, as illustrated in Fig. 1, while when fluid is to be delivered to the right-hand side of the pump housing the plug 101 is threaded into the opening 54*b*, as illustrated in Fig. 10. The ensuing description of the component parts of the pressure regulator is concerned with the delivery of fluid to the outlet on the left-hand side of the housing.

The outer end of the passage or opening 102 in the plug 101 is preferably threaded as indicated at 102*a* for the reception of the outlet conduit. During shipment of the fuel unit, a sealing plug 103 may be inserted into the threaded portion 102*a* in order to prevent dirt and other foreign substances from entering the passage 102. The passage 102, as illustrated in Fig. 1, may be formed in steps of progressively decreasing diameter from left to right, so that the inlet to the passage is provided by a small orifice 104 formed centrally of the inner end of the plug 101. The plug 101 further comprises a portion 105 of reduced diameter over which is drive fitted an elongated sleeve 106. The latter sleeve is provided with a pair of diametrically opposed, radially extending openings 107 connecting the fluid chamber 46 to the interior of the sleeve. The sleeve 106 further includes a reduced diameter portion 108 which fits closely within an opening 43*a* in the wall 43 of the housing. The engaging surfaces of the sleeve 106 and the wall portion 43 are machined to provide a close fit tending to obstruct passage of fluid along the outer surface of the sleeve between the chambers 45 and 46. To complete the fluid seal there is provided a sealing ring 109 seated within an annular groove formed in the periphery of the reduced diameter portion 108. To install the pressure regulator, the plug 101 is threaded into the opening 54*a* until the sealing ring 109 is firmly seated within an annular recess 110 formed in the wall 43 adjacent the opening 43*a* so that the sealing ring prevents the flow of fluid between the chambers 45 and 46. The construction enables the plug 101 to be brought into tight metal to metal contact with the housing to seal chamber 46 from the outside of the pump.

Diametrically opposed by-pass openings 111 formed adjacent the inner end of the reduced diameter portion 108 of the sleeve 106 function to provide fluid communication between the interior of the sleeve and the by-pass reservoir 45 whenever the pressure of the fluid delivered through the openings 107 exceeds a predetermined value. In order to cover and uncover the openings 111 and, hence, to control the by-pass of fluid from the pump outlet to the by-pass reservoir, there is provided a hollow, open ended piston 112 slidably mounted within the sleeve 106. The piston 112 is provided with a land 113 adjacent its open end having a diameter closely fitting within the sleeve 106, for the purpose of covering or uncovering the openings 111 as the piston 112 is moved within the sleeve under the influence of the fluid pressure delivered to the pump outlet. The piston 112 cooperates with the interior of the sleeve 106 and with the inner end of the plug 101, which is provided with a valve seat defining nib 101*a* to define an outlet chamber 115 in fluid communication with the ports 107. To this end, the outer end of the piston 112 is covered with a thin disc 114 preferably formed of plastic. The disc may be held upon the closed end of the piston in any suitable manner as by crimping over spaced apart, longitudinally extending projections formed on the piston. To provide for balancing of pressures on the opposed faces of the disc 114, the closed end of the piston is preferably provided with a plurality of balancing openings 112*a* connecting the inner face of the disc with the by-pass reservoir 45. The purpose of these openings is to relieve pressure which may be present on the inner face of the disc and which, unless relieved, may unseat the disc from the end of the piston 112 to prevent proper operation of the pressure regulating mechanism. It is common for a mixture of air and oil to be pumped, and this mixture would be expected to disperse throughout chamber 115, even working into the space back of disc 102. Due to the relatively high pressure in the pump discharge passages this air occupies very little space, but upon releasing pressure in these passages during shutdown of the unit, air entrapped back of the disc tends to expand, and would unseat the disc from its crimping but for relief of the resulting pressure through balancing holes 112*a*.

Until the pump has been in operation for sufficient time to build up pressure within the chamber 115, the piston 112 and disc 114 are urged to the left so that the disc is seated on seat 101*a* to maintain the orifice 104 closed to prevent delivery of outlet fluid. Obviously, when the pressure within the chamber 115 is sufficient to move the piston 112 to the right as viewed in Fig. 1, the land 113 uncovers the openings 111, whereupon fluid flows from the chamber 115 through a spiral groove 116 formed in the outer periphery of the piston 112 and through the openings 111 to the by-pass reservoir 45. The piston 112 is normally urged toward the plug 101 by means of a coil spring 118 having one end positioned within the hollow of the piston 112 and having its other end in engagement with a plug assembly disposed within the opposite end of the cylindrical portion 54 of the housing. This plug assembly includes a plug 120 having an externally threaded portion 120*a* which is adapted to be inserted into the opening 54*b* in the housing. The plug 120 includes an integral, inwardly extending sleeve 121 having a portion of reduced diameter extending through an opening 44*a* in the wall 44 of the housing. This reduced diameter portion is provided with an annular groove seating a gasket or sealing ring 123 which is also seated within an annular recess 124 formed in the wall 44 around the opening 44*a*. Thus, to assemble the pressure regulator, the plug 120 is threaded into its associated opening 54*b* until the sealing ring 123 is firmly seated within the recess 124, thereby preventing the flow of fluid between the chambers 45 and 47. The plug 120 is provided with an internally threaded central opening 125 which accommodates an adjusting screw 126 having its inner end seated against a hollow, open ended piston 127 of hexagonal shape slidably mounted within the sleeve 121. The hollow portion of the piston 127 provides a chamber for accommodating one end of the spring 118. The adjusting screw 126 may be threaded into or out of the opening 125 in order to move the piston 127 within the sleeve 121 and regulate the spring pressure applied to the piston 112, thereby controlling the pressure required to move the piston 112 a sufficient distance to uncover the by-pass ports 111. In this manner, the pressure of the fluid delivered to the oil burner from the outlet passage 102 may be accurately controlled. When the pressure of the fluid exceeds the predetermined value set in by the adjusting screw 126, the excess fluid is, of course, by-passed to the reservoir 45.

As is recognized in the oil heat industry, commercially available spray nozzles require a certain established supply pressure to "atomize" fuel oil. With typical domestic fuels this pressure is about 40 p.s.i. gauge. To avoid a possible condition where the nozzle supply pressure might fall below this atomizing pressure thus rendering the fuel incapable of proper burning, it is customary in fuel unit regulating valves to provide an outlet cut-off valve so arranged as to firmly close the nozzle conduit as the pressure reduces to some value considered to be safely in excess of this atomizing point. Since the safety and cleanliness of operation of the burner are dependent on this function, the establishment of good control of the dimensions of the valve affecting this phase of operation is mandatory. In the present invention this control is established by closely relating the distance between the seat nib 101*a* and the cross passage or opening 111 with the distance between the edge of land 113 and the sealing surface of disc 114. It may be observed that since plug 101, piston 112, and sleeve 106 remain substantially one assembly, plug 101 may be inserted into openings 54*a* or 54*b* without altering this vital relationship.

The hexagonal shape of the piston 127 provides a continuous connection between the by-pass reservoir 45 and the hollow portion of the piston. In the single stage pumping device being considered at the present time this fluid flow is unimportant but, as described hereinafter, it serves a very useful purpose when the unit is assembled for two stage operation in a two pipe system.

As previously indicated, the position of the plugs 120 and 101 may be reversed, as indicated in Fig. 10, in order to provide for the delivery of fluid to an outlet disposed on the right-hand side of the pump housing. Under these conditions, the plug 101 is threaded into the opening 54*b*, while the plug 120 is threaded into the opening 54*a*. When the position of the plugs is thus reversed, the ports 107 will open to the chamber 47, with the result that the fluid delivered to this chamber flows through the orifice 104 and the passage 102 to the outlet which is now disposed on the right-hand side of the housing. As described hereinafter, the reversal of the component parts of pressure regulator 100 to effect the selective delivery of fluid either to the left-hand side or the right-hand side of the housing is accompanied by a rearrangement of the elements comprising the pumping unit 130.

Figure 5:
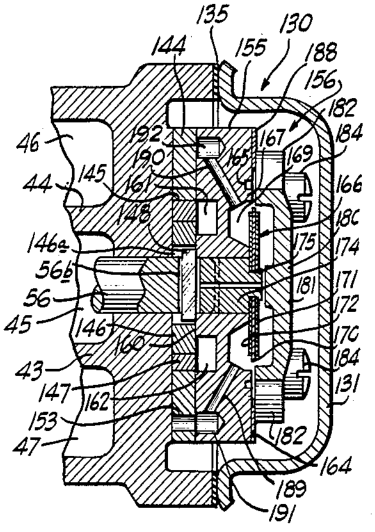
Fig. 5 is a fragmentary and sectional view taken along a line substantially corresponding to the line 5—5 in Fig. 2 and illustrating particularly the arrangement of plates employed in a single-stage unit characterized by the features of the present invention.

Referring now to the pumping unit 130, which is best illustrated in Figs. 2, 5 and 8, it will be observed that this unit is mounted on the external face of the wall 73 and is enclosed by a cup-shaped cap or cover 131 having a flanged base portion 132 of substantially hexagonal shape provided with spaced apart openings through which machine screws 133 may be passed to assemble the cover on the housing. The inner ends of each of the machine screws 133 engage a tapped opening 134 formed in the housing 40. A sealing gasket 135 interposed between the base portion 132 and the wall 73 prevents the escape of fluid from the pumping unit. The cover plate 131 cooperates with the external face of the wall 73 to define an inlet space 136 which is in fluid communication with the inlet chambers 48 and 49 through passages 137 and 138, respectively, extending through the wall 73. Thus, both of the inlet chambers 48 and 49 are effectively connected to the inlet space 136 to deliver fluid to the pumping unit 130. The wall 73, in addition to the inlet passages 137 and 138, is provided with a first pair of spaced openings 139 and 140 leading to the chamber 47.

The pumping unit 130 is formed of an assembly of elements comprising a pump plate 144, a cover plate 155 and a filtering apparatus indicated generally at 156, assembled in face-to-face relationship and mounted on the external face of the wall 73. All of the contiguous surfaces on the plates 144 and 145 and on the wall 73 are machined to provide for a close fluid-tight fit.

The pumping plate 144, as illustrated in Fig. 8, is provided with a relatively large, eccentrically formed opening 145 for receiving the pump gears for the single-stage pump, illustrated in Figs. 1–17, inclusive. This pump is of the internal gear type and comprises an externally toothed gear 146 affixed to the drive shaft 56 and meshing with an eccentric rotor or internally toothed ring gear 147 both disposed within the opening 145. The gear 146 is secured to the drive shaft 56 by means of a pin 148 (Fig. 5), passing through a slot *56b* (Fig. 2) and having its opposed ends seated within diametrically opposed key slots *146a* formed in the gear 146. By the described construction, the gear 146 is mounted for rotation with the shaft *56a* and cooperates with the internally toothed gear 147 to pump fluid in conventional manner. The gear plate 144 further comprises four spaced screw-receiving openings 149 and a pair of stud-receiving openings 150, by means of which the plate 144 may be secured to the wall 73 as described below. In addition, the plate 144 includes a pair of through fluid openings or passages 151 and 152 and a fluid-directing, elongated slot 153 extending from its front face to its rear face.

The cover plate 155 includes four spaced apart screw-receiving openings 157 in alignment with the corresponding openings 149 in the plate 144 and also includes a pair of stud-receiving indentations 159 extending only partly through the cover plate 155 in alignment with similar openings 150 in the plate 144. In addition, the plate 155 includes a central opening 158 for accommodating the extreme end of the drive shaft 56. The cover plate 155 has a front face 160 resting against the pump plate 144 when the single-stage pump is assembled in the manner illustrated in Figs. 2 and 5. The front face 160 is illustrated in Fig. 7 and includes a pair of spaced apart fluid pockets 161 and 162, each having a somewhat triangular shape and each consisting of an indentation or recess formed in the face 160 of the cover plate. The fluid pockets 161 and 162 are adapted to function as a suction pocket or a pressure pocket for delivering fluid to or receiving fluid from the gears 146 and 147 comprising the pumping elements of the single-stage pumping device. Thus, in one position of the cover plate 155 the pocket 161 may be a suction pocket forming an inlet to the pump, while under another condition this same pocket may function as a pressure pocket for receiving the fluid delivered at the outlet of the pumping gears. The face 160 of the cover plate is also provided with an entrapment relief port 163, best shown in Figs. 2 and 7, which serves to pass fluid from one side of the meshing pump gear teeth to the other. Thus, the relief port 163 serves to relieve the high pressure fluid developed in the inlet side of the intergear region and this port is of sufficient size to pass the fluid to the outlet side of that region.

The cover plate 155 has a rear face 164 which is constructed to form a portion of the filtering or fluid straining apparatus 156 referred to above. This fluid straining apparatus is generally similar to the arrangement disclosed and claimed in United States Patent No. 2,668,623 of David J. Munroe, assigned to the same assignee as the present invention and, accordingly, will not be considered in detail. Briefly considered, this filtering apparatus comprises an annular filtering groove 165 formed in the rear face 164. This filtering groove or, more particularly, the walls of the cover plate 155 which define the groove cooperate with a rotatable cleaner blade assembly 166 to remove foreign particles from the inlet fluid flowing from the chamber 136. The strained fluid passes into a somewhat annular recess defined between one of the walls 167 forming the groove 165 and an axially extending hub 168 located centrally of the rear face 164 of the cover plate.

Figure 4:
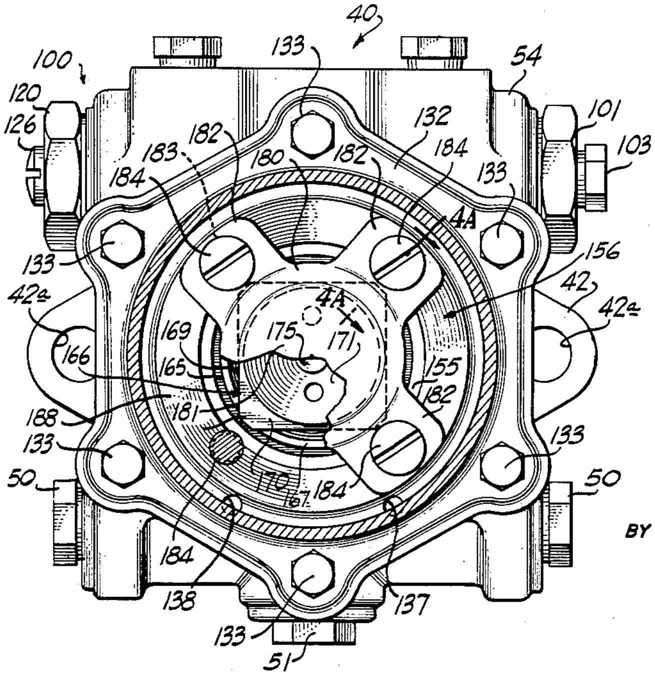
Fig. 4 is a sectional view taken along a line substantially corresponding to the line 4—4 in Fig. 2 with a portion of the structure being broken away in order to facilitate the illustration.

The rotatable cleaner blade assembly comprises a thin, substantially square-shaped cleaner blade 170 disposed between a pair of circular supporting discs 171 and 172. As is best shown in Fig. 4 of the drawings, the corners of the square-shaped cleaning discs 171 and 172 and the blade 170 may be held in assembled relationship with respect to each other and with respect to a small, axially extending stub shaft 174 in any suitable manner, as, for example, by a rivet 175.

The cleaner blade assembly is drivingly connected with the pump shaft 56 in such manner as to permit the blade assembly automatically to align itself with respect to the filtering groove 165. This is accomplished by a tongue and slot connection, including a central aperture 176 in the assembly and a forwardly extending tongue 177 on the stub shaft 174, which tongue extends into engagement with the diametrical slot *56b* in the end of the shaft 56. Through this driving connection the cleaner blade assembly is rotated with the pump shaft 56, while at the same time limited relative movement is provided to make the blade assembly substantially self-aligning and to compensate for variations in length of the shaft and the like.

As illustrated in Figs. 2 and 5, the rotatable cleaner blade assembly is disposed in a recess formed between the rear face of the cover plate 155 and a second cover plate 180, which includes a central hub portion 181 and four spaced apart, radially extending spokes 182, each of which includes a screw-receiving opening 183 therein. The cover plate is provided with an annular groove *180a* having a radius equal to that of the groove 165 described above. These two grooves face each other from opposite sides of the cleaner blade 170 and cooperate with the blade to provide the filtering action. The four openings 183 in the spokes 182 are aligned with the openings 157 in the cover plate 155 and with the openings 149 in the pump plate 144, so that machine screws 184 may be passed through the aligned openings and into engagement with tapped openings provided in the wall 73 for the purpose of securing the pumping unit 130 to the housing 40. When the plates 144 and 155 are thus assembled, aligning studs 186, which are drive fitted into suitable openings in the wall 73, project through the openings 150 in the pump plate 144 and into the indentations 159 provided in the front face of the cover plate 150.

The cover plate 180 is spaced from the rear face 164 of the plate 155 by means of a thin spacer ring 188 having a thickness substantially equal to that of the cleaner blade 170, thereby providing a working space in which the blade 170 may rotate. The spacer ring is, of course, provided with suitable openings through which pass the attaching screws 184.

The inlet oil in the space 136 flows into the annular grooves 165 and *180a*, where it is filtered in the area between the walls defining the grooves and the corners of the blade 170. The grooves are effectively cleaned by the blade 170, which provides a cutting and throwing out action upon foreign particles or sludge contained in the oil within the chamber 136 and delivers strained or filtered fluid to the annular recess 169. The filtered fluid delivered to the recess 169 passes through the cover plate 155 by means of a pair of inclined, diametrically opposed passageways 189 and 190 which extend through the wall 167 and open into ports 191 and 192, respectively, on the front face 160 of the cover plate. The oil delivered through the passages 189 and 190 is controlled by the position of the pump plate 144 and is delivered to either one or the other of the fluid pockets 161 or 162 for further delivery to the pumping gears.

As indicated above, the relative positions of the plates 144 and 155 may be so manipulated that outlet fluid from the pump is delivered either to the chamber 46 or to the chamber 47, from whence it flows to an outlet disposed either on the left-hand side or on the right-hand side of the pump housing. Moreover, the plates 144 and 155 may be so manipulated that delivery to either of these outlets may be effected with either a clockwise or a counterclockwise rotation of the shaft 56. The assembly of the plates to provide delivery to an outlet disposed on the left-hand side of the pump housing and to provide pumping action with counterclockwise drive of the shaft 56 is illustrated in Figs. 6 and 7 and is diagrammatically shown in Fig. 13. As previously described, for delivery to the outlet on the left-hand side of the pump, the pressure regulator must be assembled as illustrated in Figs. 6 and 7, the fluid flowing through the passageway 190 to the port 192 is confronted by a solid portion of the plate 144 and, hence, the port 192 is blocked. The fluid flowing through the port 191, on the other hand, passes through the elongated slot 153 in the plate 144 and is delivered to the opening 142 in the wall 73. The fluid flowing through the passage 142 passes into the chamber 47, which, with the pressure regulator 100 arranged as shown in Figs. 1 and 3, is completely sealed. Fluid in the chamber 47 passes through opening 141 and through the passage 152 in the plate 144 to the fluid pocket 162, which, in this position, functions as a suction pocket for delivering fluid to the inlet of the pumping gears 146 and 147. The pumping gears, of course, function in conventional manner when rotated in a counterclockwise direction to pressurize the fluid and deliver it to the fluid pocket 161, which is opened at its lower left-hand corner, to the hole 151 in the plate 144. Thus, the pressurized fluid is delivered through the opening 151 and through the passage 139 in alignment therewith to the chamber 46, where it passes to the outlet through the ports 107 and the passage 102 in the pressure regulator in the manner described above.

For delivery of fluid to the same outlet when the direction of drive is reversed, that is, when the shaft 56 is rotated in a clockwise direction, the pumping unit 130 is reassembled by first removing the cover 131 and the machine screws 184 and then rearranging the plates 144 and 155 in the manner shown in Fig. 9. To assemble the plates in this manner, the cover plate 155 is rotated through an angle of 180° about the axis of the drive shaft from the position shown in Fig. 7 until the entrapment relief port 163 in the front face appears at the top of the housing. The position of the pressure regulator 100 is, of course, not changed. The pump plate 144 is rotated about a horizontal axis extending normal to the axis of the drive shaft to an angle of 180° from the position shown in Fig. 6. When the plates 144 and 155 have been arranged as described, the unit is, of course, reassembled by passing the machine screws 184 through the aligned openings as indicated above, at which time, as indicated in Fig. 14, fluid delivered through the passage 189 will be confronted by a blank face on the plate 144, so that the port 191 is blocked. The port 192 delivers fluid through the elongated slot 153 and through the passage 141 to the sealed chamber 47. Fluid flows out of the chamber 47 through the passage 142 and through the opening 152 to the fluid pocket 161, which, under these conditions, functions as a suction pocket. Fluid from the suction pocket 161 is caused to enter the pumping gears by turning shaft 56 and the gears clockwise. This fluid is pressurized by the gears and delivered to the hole 151. It then flows through passage 140 into the chamber 46 and then passes to the outlet in the manner described above.

If it is desired to deliver fluid to the right-hand side of the pump housing, the position of the plugs 101 and 120 of the pressure regulator 100 are reversed so that they occupy the positions shown in Fig. 10. The described reversal of the parts of the pressure regulator mechanism 100 is accompanied by an appropriate change in the position of the plates 144 and 155 to effect the desired delivery of outlet fluid to the right-hand side of the housing, irrespective of the direction of drive of the shaft 56. To rearrange the plates, the pumping unit is disassembled by removing the screws 184 and by removing the plates 144 and 155 from the studs 186. For counterclockwise rotation of the shaft 56, the unit is then rearranged as shown in Fig. 11 with the cover plate 155 occupying exactly the same position as shown in Fig. 9. The pump plate 144, on the other hand, is rotated about the axis of the drive shaft through an angle of 180° from the position shown in Fig. 6. When the plates 144 and 155 have been moved to the described positions, the unit is reassembled, at which time, as illustrated in Fig. 15, the inlet port 192 is again blocked by the plate 144, while the inlet port 191 is connected through the slot 153 and through passage 139 to the sealed chamber 46. The chamber 46 delivers inlet fluid through passage 140 and through opening 152 to the pocket 162, which again functions as a suction pocket delivering fluid to the inlet side of the pumping gears. The gears 146 and 147, during counterclockwise rotation of the shaft 56, pressurize the fluid and deliver it to the pocket 161, which is exposed at its upper right-hand corner to the opening 151 in the pump plate 144. The opening 151 delivers pressurized fluid through passage 142 to the chamber 47 for passage to the outlet on the right-hand side of the pump housing through the openings 107 in the pressure regulator mechanism.

If the shaft 56 is driven in a clockwise direction and fluid is to be delivered to the right-hand outlet, the pumping unit is reassembled so that the plates 144 and 155 occupy the positions shown in Figs. 12 and 16, that is, with the cover plate 155 occupying the same position as illustrated in Fig. 7 and with the pump plate 144 rotated through an angle of 180° about a vertical axis passing normal to the axis of the drive shaft from the position shown in Fig. 6. With the plates assembled in this manner, the port 191 is again blocked by the plate 144, but the port 192 delivers fluid through the slot 153 to the passage 140 and from there to the sealed chamber 46. Inlet fluid flows from the chamber 46 through the passage 139 and through the opening 152 to the pocket 161. From the pocket 161 the fluid is delivered by the pumping gears 146 and 147 to the pressure pocket 162, which is exposed at its lower right-hand corner to the opening 151 in the plate 144. The opening 151 is aligned with the passage 141 in the wall 73, with the result that pressurized fluid flows to the chamber 47 for delivery to the outlet disposed on the right-hand side of the pump housing.

Thus, it will be recognized from the foregoing description that the single-stage pumping device illustrated in Figs. 1 to 17, inclusive, is adapted for use with an inlet disposed either on the left-hand side or on the right-hand side of the fuel unit and may be selectively operated to deliver fluid to an outlet disposed either on the left-hand side or the right-hand side of the pump housing and may be successfully operated either by clockwise or counterclockwise rotation of the pump shaft. In addition, the fuel unit may be employed either in a one-pipe system or a two-pipe system to deliver fluid under any desired pressure to an oil burner.

Another significant advantage of the present invention resides in the fact that with a few relatively minor changes the unit can be converted from a single-stage device, described above, to a two-stage device using the same pump housing as illustrated in Figs. 18 to 32, inclusive. As a matter of fact, the only changes required to convert from single-stage to two-stage operation are the following: (1) a new center plate 200 must be employed between the two pumping stages; (2) an additional pump plate, 201, identical to the pump plate 144, must be used; (3) new studs 286, similar to but longer than the studs 186, must be used, in order to accommodate the additional elements 200 and 201; (4) machine screws 284, similar to but longer than the machine screws 184 described above, must be used, due to the increased height of the stack of elements assembled on the pump housing and comprising the two-stage pumping unit; (5) a new end cover plate 231, which is similar to, but deeper than the cover plate 131, must be provided to enclose the pumping units; and (6) a drive shaft 256 having its end extending a greater distance beyond the wall 73 must be employed in place of the shaft 56 used in the single-stage device.

As indicated above, the pump plate 201 is identical to the plate 144 previously described and includes a relatively large, eccentrically formed opening 245, in which are disposed the pumping gears for the second stage of the pumping device. These pumping gears are identical to the corresponding gears employed in the first stage and include an externally toothed gear 246, secured to the pumping shaft 256 by means of a circular pin 248 which passes through a hole 256*b* formed in the shaft and which has its diametrically opposed ends in engagement with suitable slots formed in the gear 246. The second stage pumping unit also includes an eccentric, internally toothed ring gear 247 dimensioned to be received closely within the opening 245 in the pump plate 201. The gear plate 201 also includes a pair of spaced apart fluid directing openings 251 and 252 and an elongated fluid directing slot 253 passing completely through the pump plate.

As illustrated in Fig. 28, the center control plate 200 has a front face 202 which is adapted to be seated against and engage one face of the plate 201, and a rear face 203 which is adapted to be seated against the pump plate 144 for the first stage. The front face 202 includes a pair of spaced apart, somewhat triangularly shaped, fluid receiving pockets 261 and 262, which are in the form of recesses extending only part way through the center control plate 200 and communicating with through openings 265 and 266, respectively, which extend from the front face to the rear face of the plate 200.

The plate 200 also includes four spaced apart screw receiving openings 204 through which pass the machine screws 284 employed in the assembly of the two-stage pumping device. In addition, the plate 200 includes a pair of diametrically opposed stud receiving openings 205 for accommodating the assembly studs 286. The front face 202 of the center plate is suitably recessed to provide an entrapment relief port 207, best shown in Figs. 18 and 29, like the relief port 163 previously described. When the plates 201, 200, 144 and 155 are assembled upon the wall 73 of the pump housing in the manner shown in Figs. 18, 19, 20 and 21, the two-stage pumping device is arranged to deliver fluid to an outlet disposed on the left-hand side of the pump housing when the pump shaft 256 is rotated in a counterclockwise direction. Under these conditions, the pressure regulator mechanism 100, of course, is assembled in the manner illustrated in Fig. 1. The fluid, as is illustrated in Fig. 29, passes from the inlet chamber 236 through the filtering apparatus to the inlet passages formed in the cover plate 155. The inlet port 192 is covered by the rear face of the pump plate 144, but the fluid passing to port 191 is delivered through the elongated slot 153 to the indentation 264 in the center control plate 200, where it flows upwardly and back through the opening 152 to the fluid pocket 162 forming the suction side of the first stage pumping device. The through passage 266, which is in communication with the indentation 264, is blocked by the rear face of the pump plate 201 and, hence, the fluid flowing to the inlet of the first stage pumping device does not enter the second stage. The gears 146 and 147 comprising the pumping elements of the first stage pumping device pressurize the fluid flowing to the pocket 162 when the shaft 256 is rotated in a counterclockwise direction and deliver the fluid to the fluid pocket 161, which has its upper right-hand corner exposed to the opening 151 in the pump plate 144. The fluid at the outlet of the first stage pumping device is then delivered from the opening 151 to the elongated indentation 263 and, through the opening 265, through the elongated slot 253 and through the passage 142, to the sealed fluid chamber 47. Fluid flows from the chamber 47 through the passage 141 in the wall 73 and through the opening 252 to the fluid pocket 261, which is connected to the suction side of the gear elements 246 and 247 comprising the second stage pumping device. The gears 246 and 247, when shaft 256 is rotated in a counterclockwise direction, cooperate to pressurize the fluid flowing to the pocket 261 and deliver it to the pocket 262. The latter pocket is connected at its lower left-hand corner to the passage 251 in the pump plate 201. Thus, the outlet fluid from the second stage pumping device flows through the opening 251 and through the passage 139 to the chamber 46 in the pump housing. With the pressure regulator arranged as illustrated in Fig. 1, the fluid delivered to the chamber 46 is passed through the ports 107 to the passage 102 leading to an outlet disposed on the left-hand side of the pump housing. The passage 140 in the wall 73 is, of course, blocked by the front face of the plate 201 to prevent outlet fluid from reentering the second stage. Thus, the arrangement of plates illustrated in Figs. 20, 21 and 29 is such that the fluid is delivered to an outlet located on the left-hand side of the pump housing when the shaft 256 is rotated in a counterclockwise direction.

If delivery to the left-hand outlet is desired for clockwise rotation of the shaft 256, the plates 201, 200, 144 and 155 may be rearranged until they occupy the positions shown in Figs. 22 and 23. Specifically, the cover plate 155 and the center plate 200 are both rotated through an angle of 180° about the axis of the drive shaft 256 from the position shown in Fig. 29, while the pump plates 144 and 201 are each rotated from the position shown in Fig. 29 through an angle of 180° about a horizontal axis extending normal to the axis of the drive shaft.

After the plates have been moved to the positions described, they are reassembled on the wall 73 of the pump housing by inserting the machine screws 284 through the aligned openings and into engagement with the tapped openings in the housing. With the plates thus assembled, the inlet fluid passing through the port 191 is blocked by the rear face of the gear plate 144, as is illustrated in Fig. 30. The inlet fluid delivered to the port 192 passes through the elongated slot 153, to the elongated indentation 263, which is connected at its lower end to the through passage 265 and to the opening 152 in the plate 144. The opening 265 is blocked at its forward end by the rear face of the pump plate 201, but the fluid delivered to the opening 152 flows into the pocket 161 connected to the suction side of the first stage pumping gears. The outlet fluid from the first stage pumping gears is delivered to the fluid pocket 162, which is connected at its lower right-hand corner to the passage 151. The latter passage delivers fluid through the opening 266, through the elongated slot 253 and through the passage 141 in the wall 73 to the sealed fluid chamber 47. Fluid in the latter chamber flows through the passage 142 and through the opening 252 to the fluid pocket 262, which is connected to the suction side of the pumping gears of the second stage pumping device. The output fluid from the second stage pumping gears flows to the fluid pocket 261, which is connected at its upper left-hand corner through the opening 251 and through the passage 140 to the fluid chamber 46. As indicated above, the latter chamber delivers fluid through the pressure regulating mechanism 100 to the outlet disposed on the left-hand side of the pump housing. Thus, the assembly of plates illustrated in Fig. 30 is effective to deliver fluid to the left-hand outlet when the pump shaft 256 is rotated in a clockwise direction.

If delivery to the outlet located on the right-hand side of the pump housing is desired, it is necessary to rearrange the elements of the pressure regulating mechanism 100 until they occupy the positions illustrated in Fig. 10. When this is done, the plates 201, 200, 144 and 155 are removed from the wall 73 by removing the machine screws 284. The plates are then reassembled in the manner illustrated in Figs. 24 and 25, in which the center plate 200 and the cover plate 155 have both been rotated through an angle of 180° about the axis of the drive shaft from the position shown in Fig. 29. The plates 144 and 201 are also rotated through an angle of 180° about the axis of the drive shaft from the position shown in Fig. 29. With the plates thus assembled, the fluid flowing to the inlet port 192 is blocked by the rear face of the plate 144, as is illustrated in Fig. 31. The inlet fluid flowing to the port 191 is, on the other hand, delivered through the elongated slot 153 to the elongated indentation 264, leading to the opening 266. The front of the opening 266 is blocked by the rear face of the pump plate 201, but the rear of this opening is connected through the passage 152 to the pocket 162, thereby to deliver inlet fluid to the suction side of the pumping gears of the first stage pumping device. The outlet fluid from the first stage pumping device is, of course, delivered to the fluid pocket 161, which is connected at its lower left-hand corner through the passage 151, through the opening 265, through the elongated slot 253 and through the passage 139 to the sealed fluid chamber 46. The fluid in the chamber 46 flows through the passage 140 and through the opening 252 to the fluid pocket 261, connected to the suction side of the pumping gears of the second stage pumping device. The output of the second stage pumping device is delivered to the fluid pocket 262, which is connected at its upper right-hand corner through opening 251 and through passage 142 to the fluid chamber 47. With the pressure regulating mechanism assembled as illustrated in Fig. 10, the outlet fluid from the second stage of the pumping device, which is delivered to the chamber 47, flows through the ports 107 and the passage 102 to a fluid outlet disposed on the right-hand side of the pump housing. Thus, with the plates arranged as illustrated in Fig. 31 fluid flow to the right-hand outlet is effected with counterclockwise rotation of the shaft 256.

For delivery to the right-hand outlet, when the shaft 256 is rotated in a clockwise direction the pumping plates are reassembled in the manner illustrated in Figs. 26, 27 and 32, in which case the plates 200 and 155 occupy exactly the same positions as they did in the arrangement illustrated in Fig. 29. The plates 144 and 201, on the other hand, have been rotated through an angle of 180° about a vertical axis passing normal to the axis of the drive shaft from the position illustrated in Fig. 29. With the plates thus arranged, the port 191 is blocked by the rear face of the pump plate 144, but the inlet fluid delivered to the port 192 flows through the elongated slot 153 to the elongated indentation 263, which is connected to the through passage 265. The latter passage is blocked at its front end by the rear face of the plate 201, but at its rear end the passage 265 passes fluid through opening 152 to the fluid pocket 161, which is connected to the suction side of the pumping gears of the first stage. The output fluid from the first stage is delivered to the fluid pocket 162, which is connected at its upper left-hand corner through passage 151, through opening 266, through elongated slot 253 and through passage 140 to the sealed fluid chamber 46. The latter chamber delivers fluid through the passage 139 and through the opening 252 to the fluid pocket 262 for passage to the suction side of the pumping gears of the second stage. The output fluid from the second stage is delivered to the fluid pocket 261, which is connected at its lower right-hand corner through passage 251 and through passage 141 to the fluid chamber 47. With the pressure regulating mechanism 100 assembled as illustrated in Fig. 10, the fluid chamber 47 provides outlet fluid for delivery to the outlet disposed on the right-hand side of the pump housing. Thus, with the plates arranged as illustrated in Fig. 32, delivery to the right-hand outlet is effected with clockwise drive of the shaft 256.

In view of the above description, it will be recognized that the two-stage pumping device illustrated in Figs. 18 to 32, inclusive, employs the same pump housing as the single-stage device, and this two stage device may be arranged for either clockwise or counterclockwise rotation of the pump shaft and for delivery of fluid either to the right-hand or left-hand outlet with the inlet disposed on either the left-hand side or the right-hand side of the housing. Moreover, due to the duplication of parts employed the construction is characterized by relatively low manufacturing cost and ease of assembly and repair. Moreover, since the elements comprising the two-stage pumping unit are all disposed on an external wall of the pump housing, they can be reached for assembly, repair or rearrangement with ease, merely by removing the end cover attached to the rear face of the pump housing. In addition, the fluid from the first stage is passed into a chamber formed in the pump housing before passing to the second stage with the result that this chamber functions as an interstage fluid reservoir.

The two-stage pumping unit, like the one-stage unit described previously, may be operated in either a one pipe or a two pipe system. As previously mentioned, one pipe operation is effected by threading plug 51 into opening 45a of the pump housing while at the same time removing the plug from opening 49b. For two pipe operation, the opening 49b is closed and a return pipe is inserted into opening 45a. In view of the above description, it is apparent that the outlet fluid from the first pumping stage is always delivered to an intermediate chamber, i.e., one of the chambers 46 or 47, formed in the pump housing and, hence, this intermediate chamber may be referred to as an interstage reservoir. In a one pipe system, this interstage reservoir is isolated from the by-pass chamber 45 by the sealing ring or gasket 123 but, in accordance with a very important feature of the present invention, when the two-stage pump is used in a two pipe system, the gasket 123 may be removed, thus uncovering a port or slot 120b in the sleeve 121 and establishing a fluid connection from the interstage reservoir to the by-pass chamber 45 through the slot 120b and through the space between the hexagonally shaped piston 127 and the inner cylindrical wall of sleeve 121. The described fluid connection provides for continuous self venting with the two pipe arrangement and, hence, allows the pump to start without priming. Specifically, at the start of operation of a single-stage pump, in the absence of a pressure or gravity head on the inlet oil, the pump tends to suck a great deal of air and attempts to develop an air pressure of sufficient value to open the pressure regulator valve but gear type pumps are incapable of building up an air pressure having such a value and, hence, the pump remains filled with air and cannot deliver oil. To overcome this, the single stage pump is generally vented during starting by opening a suitable plug to permit the escape of air or the inlet oil is maintained under pressure as by a static head to enable the oil to reach the pump inlet. Obviously, the latter factor limits the usefulness of single-stage pumps since in many installations the described solutions to the starting problem cannot be readily satisfied. When the two-stage pump of the present invention is connected in a two pipe system, however, the continuous self-venting feature permits the passage of air from the outlet of the suction pumping stage through the port 120b and through the by-pass reservoir 45 to the exhaust pipe connected to opening 45a. Thus, during starting, the discharge from the suction pump stage works against nothing but atmospheric pressure and, hence, it will draw up liquid fuel to provide an immediate supply for filling the various chambers in the pump casing and for delivery to the pressure pump. When the two-stage pump is operated in a one pipe system, the return of air from the outlet of the suction stage to the inlet of this stage would serve no useful function during starting. However, in most installations a two pipe system is provided and in these cases the full advantages of the present pump unit can be realized.

The continuous by-pass of fluid from the interstage reservoir to the by-pass reservoir 45 also provides a return path for the excess oil delivered by the suction pump. Thus, even though the pumping gears of the two stages are identical in size, have the same size gear teeth and tooth spaces, and are rotated at the same speed, the suction stage pump generally delivers more oil than the pressure pump due to the fact that the gear teeth of the suction stage are working against a relatively low pressure while the gear teeth of the pressure stage work against a very high pressure. As a result, there is more slippage or leakage in the pressure stage pump and more liquid is drawn up to the inlet side of the suction pump than is delivered to the outlet passage 102. The interstage reservoir, of course, stores the fluid from the first pump stage and passes any excess through the described venting path to the by-pass reservoir 45.

While particular embodiments of the invention have been shown, it will be understood, of course, that the invention is not limited thereto, since many modifications may be made, and it is therefore contemplated by the appended claims to cover any such modifications as fall within the true spirit and scope of the invention.

Having thus described the invention, what is claimed as new and desired to be secured by Letters Patent of the United States is:

1. A fuel unit comprising a pump casing having means therein defining first and second spaced apart inlet chambers located on opposite sides of the casing formed on opposite side walls of the casing whereby inlet fluid may be selectively supplied to either inlet, first and second spaced apart outlet chambers respectively located adjacent said inlet chamber and on opposite sides of the casing adjacent said side walls, a shaft journaled in said casing, a pumping unit comprising a plurality of stacked plates mounted on an end wall of said casing exposed to both of said outlet chambers and including at least one pair of gears one of which is mounted on said shaft, first and second passage means extending through the end wall of said casing and respectively connecting said first and second inlet chambers to deliver inlet fluid to said pumping unit, said casing having a plurality of spaced apart openings through said end wall connecting said outlet chambers to said pumping unit, and the plates of said pumping unit being provided with ports and passages therein so arranged that the plates may be selectively assembled to deliver outlet fluid from the pumping unit through a predetermined one of said openings to a selected one of said outlet chambers, said plates also being capable of arrangement to deliver outlet fluid to the selected outlet chamber regardless of the direction of drive of the shaft.

2. A fuel unit comprising a pump casing having opposed side walls each of which has defined therein an inlet and an outlet, means defining a pair of outlet chambers in said casing respectively located adjacent said outlets, a shaft carried by said casing and extending through an end wall thereof, a pumping unit mounted on the exterior of said end wall of said casing and comprising a plurality of stacked plates including at least one gear plate and one cover plate, a pair of pumping gears housed in said gear plate with one of said gears being mounted on said shaft, passage means extending through said end wall of said casing and connecting each of said inlets to deliver inlet fluid to said cover plate, said end wall of said casing having a plurality of spaced apart openings connecting each of said outlet chambers to said pumping unit, and the plates of said pumping unit being provided with ports and passages therein so arranged that the pumping unit may be selectively assembled in different arrangements to deliver inlet fluid through said cover plate to the pumping gears and to deliver outlet fluid from the pumping unit through a predetermined one of said openings to a selected one of said outlet chambers, said plates being capable of rearrangement to effect delivery of outlet fluid to the selected outlet chamber for either direction of drive of the shaft.

3. A fuel unit comprising a pump casing having opposed side walls each of which has defined therein an inlet and an outlet, means defining a pair of outlet chambers in said casing respectively located adjacent said outlets, a shaft carried by said casing, a pumping unit mounted on said casing and comprising a plurality of stacked plates including at least one gear plate and one cover plate, a pair of pumping gears housed by said gear plate with said gear being mounted on said shaft, passage means in said casing connecting each of said inlets to deliver fluid to said cover plate, means defining a first pair of spaced apart openings in said casing connecting one of said outlet chambers to said pumping unit, means defining a second pair of spaced apart openings in said casing connecting one of said outlet chambers to said pumping unit, means defining a second pair of spaced apart openings in said casing connecting the other of said outlet chambers to said pump unit, and the plates of said pumping unit being provided with ports and passages therein so arranged that the pumping unit may be assembled to deliver inlet fluid through said cover plate to the pumping gears and to deliver outlet fluid from the pumping unit through one of said openings of the first pair to said one outlet chamber when said shaft is driven in one direction, said plates being capable of rearrangement to deliver outlet fluid from the pumping unit through the other opening of the first pair to said one outlet chamber when the shaft is driven in the opposite direction, said plates also being capable of arrangement to deliver outlet fluid through one of the openings of the second pair to said other outlet chamber when said shaft is driven in said one direction, said plates also being capable of arrangement to deliver outlet fluid through the other opening of the second pair to said other outlet chamber when said shaft is driven in said opposite direction.

4. A fuel unit comprising a pump casing including walls defining a bypass reservoir located between a pair of spaced apart fluid outlet chambers, means defining a pair of spaced apart inlets respectively located on opposite side walls of said casing and opening into inlet chambers extending into said side walls, whereby inlet fluid may be selectively supplied to either of said inlets, a passage in said casing interconnecting the bypass reservoir and one of the inlet chambers, said casing including an end wall having an internal face exposed to both of said fluid outlet chambers and having a plurality of openings therethrough extending from the outlet chambers to the external face of the wall, a shaft journaled in said casing and having a portion extending through an opening in said end wall, a pumping unit comprising a plurality of stacked plates mounted on the external face of said wall and including at least one pair of pumping gears one of which is mounted on said shaft, passage means extending through said end wall of said casing and connecting each of said inlet chambers to deliver inlet fluid to said pumping unit, and the plates of said pumping unit being provided with ports and passages therein so arranged that the pumping unit may be selectively assembled in different arrangements to deliver outlet fluid from the pumping unit through a predetermined one of the openings in said wall to a selected one of said outlet chambers, said plates being capable of rearrangement to deliver outlet fluid to the selected outlet chamber for either direction of drive of the shaft.

5. A fuel unit comprising a pump casing having opposed side walls each of which has defined therein an inlet and an outlet, means in said casing defining a pair of spaced apart outlet chambers respectively located adjacent said outlets, said casing including a wall having an internal face exposed to both of said outlet chambers and having openings therethrough connecting each of the outlet chambers to the external face of said wall, a shaft journaled in said casing and having a portion extending through an opening in said wall, a pumping unit comprising a plurality of stacked plates including at least one gear plate and one cover plate mounted on the external face of said wall, said gear plate including at least one pair of pumping gears one of which is mounted on said shaft, passage means in said casing connecting each of said inlets to deliver fluid to the cover plate of said pumping unit, and the plates of said pumping unit being provided with ports and passages therein so arranged that the pumping unit may be selectively assembled in different arrangements in order to deliver outlet fluid from the pumping unit through a predetermined one of the openings in said wall to a selected one of said outlet chambers, said plates also being capable of rearrangement to deliver outlet fluid to the selected outlet chamber for either direction of drive of the shaft.

6. A fuel unit comprising a pump casing including means defining first and second spaced apart fluid outlet chambers and at least one inlet, said casing including a wall having an internal face exposed to both of said fluid outlet chambers and having a first pair of continuously open spaced apart openings therein connecting said first outlet chamber to the external face of said wall and a second pair of continuously open openings therein connecting the second outlet chamber to the external face of the wall, a shaft journaled in said casing and having a portion extending through an opening in said wall, and a pumping unit mounted on the external face of said wall in communication with said openings and comprising at least one pair of pumping elements one of which is drivingly connected to said shaft, means for delivering inlet fluid from the inlet to said pumping unit, said pumping unit including a plurality of stacked plates having ports and passages therein so arranged that fluid is delivered through the first chamber, through the first pair of openings, back to the pumping unit and then to the second chamber when said shaft is rotated in a first direction, said plates of said pumping unit being capable of rearrangement to deliver fluid through said first chamber, through the first pair of openings, back to the pumping unit and then to the second chamber when said shaft is driven in the opposite direction, said plates also being capable of rearrangement to deliver fluid through the second chamber, through the second pair of openings, back to the pumping unit and then to the first chamber when said shaft is driven in said first direction, and said plates being capable of rearrangement to deliver fluid through said second chamber, through the second pair of openings, back to the pumping unit and then to the first chamber when said shaft is driven in said opposite direction.

7. A fuel unit comprising a pump casing including means defining first and second spaced apart fluid outlet chambers and at least one inlet, said casing including a wall having an internal face exposed to both of said fluid outlet chambers and having first and second pairs of continuously open spaced apart openings therein respectively connecting each of said first and second outlet chambers to the external face of said wall, a shaft journaled in said casing and having a portion extending through an opening in said wall, and a pumping unit mounted on the external face of said wall in communication with said openings and comprising at least one pair of pumping elements one of which is drivingly connected to said shaft, means for delivering fluid from the inlet to said pumping unit, said pumping unit including a plurality of stacked plates having ports and passages therein arranged to deliver outlet fluid from said pumping elements through one of the openings of the first pair to said first chamber when said shaft is rotated in a first direction, said plates of said pumping unit being capable of rearrangement to deliver outlet fluid through the other opening of the first pair to said first chamber when said shaft is driven in the opposite direction, said plates also being capable of rearrangement to deliver outlet fluid through one of the openings of the second pair to said second chamber when said shaft is driven in said first direction, and said plates being capable of rearrangement to deliver outlet fluid through the other opening of the second pair to said second chamber when said shaft is driven in said opposite direction.

8. A fuel unit comprising a pump casing including means defining first and second fluid outlet chambers and at least one inlet, said casing having a wall exposed to both of said fluid outlet chambers and having first and second pairs of continuously open spaced apart openings therein respectively connecting the first and second outlet chambers to the external face of the wall, a shaft journaled in said casing, a pumping unit mounted on the external face of said wall in communication with said openings, means delivering inlet fluid from said inlet to the pumping unit, said pumping unit including a pair of pumping elements one of which is mounted on said shaft and said unit comprising a stack of plates having ports and passages therein arranged to direct inlet fluid through the stack of plates and through one of the openings of the first pair into the first outlet chamber from where the fluid flows through the second of the openings of the first pair and back into said stack of plates for pressurization by said pumping elements when said shaft is driven in a first direction so that outlet fluid is delivered through one of the openings of the second pair to the second of said fluid outlet chambers, the plates of said pumping unit being capable of rearrangement so that the ports and passages therein are effective to deliver fluid to the first outlet chamber and back into the stack of plates for pressurization and delivery to the second chamber when said shaft is driven in an opposite direction, said plates also being capable of rearrangement so that the ports and passages therein provide fluid flow into the second chamber and back into the stack of plates for pressurization and delivery to the first chamber when the shaft is driven in said first direction, and said plates also being capable of rearrangement so that the ports and passages therein effect delivery of fluid to the second chamber and back into said stack of plates for pressurization and delivery to the first chamber when said shaft is rotated in said opposite direction.

9. A fuel unit comprising a pump casing including means defining first and second fluid outlet chambers and said casing having a wall exposed to both of said fluid outlet chambers and having first and second pairs of continuously open spaced apart openings therein respectively connecting the first and second outlet chambers to the external face of the wall, a shaft journaled in said casing, a pumping unit mounted on the external face of said wall in communication with all of said openings, means delivering inlet fluid from said inlet to the pumping unit, said pumping unit including a pair of pumping elements one of which is mounted on said shaft and said unit comprising a stack of plates having ports and passages therein arranged to direct inlet fluid through the stack of plates and through a first of the openings of the first pair into the first of said fluid outlet chambers from where the fluid flows through the second of the openings of the first pair and back into said stack of plates where it is pressurized by said pumping elements when said shaft is driven in a first direction in order to develop outlet fluid for delivery through a first of the openings of the second pair to the second outlet chamber, the plates of said pumping unit being capable of rearrangement so that the ports and passages therein are effective to deliver fluid through the second of the openings of the first pair to the first outlet chamber and through the first opening of the first pair back into the stack of plates for pressurization and delivery through the second opening of the second pair to the second chamber when said shaft is driven in an opposite direction, said plates also being capable of rearrangement so that the ports and passages therein provide fluid flow through the first opening of the second pair into the second of said chambers and through the second opening of the second pair back into the stack of plates for pressurization and delivery through the first opening of the first pair to the first chamber when the shaft is driven in said first direction, and said plates also being capable of rearrangement so that the ports and passages therein effect delivery of fluid through the second opening of the second pair to the second chamber and through the first opening of the second pair back into said stack of plates for pressurization and delivery through the second opening of the first pair to the first chamber when said shaft is rotated in said opposite direction.

10. A fuel unit comprising a pump casing including means defining a by-pass reservoir, an inlet chamber and first and second spaced apart fluid outlet chambers therein, said casing including a wall having an internal face exposed to both of said fluid outlet chambers with a plurality of openings in said wall connecting said outlet chambers to the external face of the wall, a pumping unit secured to the external face of said wall in communication with all of said openings and including a plurality of stacked plates and at least one pair of pumping elements, one of said pumping elements being mounted upon said shaft, a shaft rotatably journaled in said casing and having a portion extending through a bore in said wall, an end cover secured to said wall to enclose said pumping unit and cooperating with said wall and said pumping unit to define an inlet space adjacent said pumping unit, passage means in said casing placing said inlet space in fluid communication with said inlet chamber, said casing including means defining first and second spaced apart outlets connected by a through bore opening to said by-pass reservoir and to both of said fluid outlet chambers, pressure regulating mechanism disposed within said bore, said pressure regulating mecahnism including means for by-passing excess fluid to the by-pass reservoir and having first and second parts arranged in a first position in detachable engagement with said first and second outlets, respectively, to deliver fluid from said first outlet chamber to the first outlet, said first and second parts being capable of being reversed so that they are in respective engagement with said second and first outlets to deliver fluid from the second chamber to the second outlet, said pump and cover plates having ports and passages therein so disposed that the plates are capable of rearrangement to provide for selective delivery of outlet fluid from the pumping unit to either one or the other of said outlet chambers irrespective of the direction of drive of said shaft, whereby said pressure regulator mechanism and said pump and cover plates may be manipulated to deliver outlet fluid through either one of said outlets and with either direction of drive of the shaft.

11. A fuel unit comprising a pump casing including means defining a by-pass reservoir and first and second fluid outlet chambers, means defining an inlet in said casing, a shaft journaled in said casing, a pumping unit comprising a stack of plates mounted on said casing and including a plurality of gear elements one of which is driven by said shaft, said casing including openings connecting said pumping unit with said first and second outlet chambers, means to deliver inlet fluid from the inlet chamber to said pumping unit, the plates of said pumping unit having passages and ports therein so arranged that the plates are capable of selective arrangement to deliver outlet fluid from the pumping unit to either of said outlet chambers, said plates also being capable of rearrangement to deliver fluid to either of said outlet chambers for either direction of drive of said shaft, means defining first and second coaxial spaced apart fluid outlets in said casing in respective communication with said first and second outlet chambers, a bore interconnecting said outlets and opening to both of said outlet chambers and to said by-pass reservoir, a pressure regulator unit in said bore including first and second parts each disposed in a different one of said outlets, one of said parts including means defining an outlet passage therein and the other of said parts including structure plugging its assoicated outlet, a fluid pressure responsive device cooperating with said one part to deliver outlet fluid to said outlet passage and to deliver excess fluid from said pumping unit to said reservoir, said parts being interchangeable in said outlets to change the location of said outlet passage from one side of the casing to the other so that when the plates of said pumping unit are appropriately arranged outlet fluid may be delivered to a selected one of the outlets.

12. A fuel unit comprising a pump casing including means defining a by-pass reservoir and a pair of spaced apart fluid outlet chambers, a driven shaft journaled in said casing, a pumping unit mounted on said casing and having a plurality of pumping elements one of which is driven by said shaft, means to deliver inlet fluid to said pumping unit, means connecting both of said outlet chambers to said pumping unit, said pumping unit comprising a plurality of plates having ports and passages therein so disposed that the plates may be arranged to deliver outlet fluid from the pumping unit to either one or the other of said outlet chambers for either direction of drive of the shaft, means defining first and second outlets in said casing, a pressure regulator including first and second parts each disposed in one of said outlets, one of said parts including an outlet passage therein and the other part including structure for plugging its associated outlet, said parts being interchangeable with respect to said outlets so that the fluid selectively delivered to said outlet chambers by appropriate arrangement of the plates of the pumping unit may flow from either one of the outlets, said pressure regulator mechanism including means for by-passing excess fluid to the by-pass reservoir.

13. A fuel unit comprising a hollow pump casing having a pair of internal partitions cooperating with the casing to define a by-pass reservoir and a pair of spaced apart fluid outlet chambers, said partitions having aligned apertures therein each interconnecting the by-pass reservoir and one of the outlet chambers, means defining an inlet chamber in said casing, a driven shaft journaled in said casing, a pumping unit mounted on said casing and having a plurality of pumping elements one of which is driven by said shaft, means to deliver inlet fluid from said inlet chamber to said pumping unit, said casing including openings connecting said outlet chambers to said pumping unit, said pumping unit comprising a plurality of plates having ports and passages so disposed that the plates may be arranged to deliver outlet fluid to either one or the other of said outlet chambers for either direction of drive of the shaft, means defining first and second coaxial outlets in said casing aligned with the apertures in said partitions, a pressure regulator including first and second parts each disposed in one of said outlets and each extending into one of said apertures, one of said parts including an outlet passage therein and the other part including structure for plugging its associated outlet, said parts being interchangeable with respect to said outlets and said apertures so that the fluid selectively delivered to said outlet chambers by appropriate arrangement of the plates of said pumping unit may flow from either one of the outlets, said pressure regulator mechanism including means for by-passing excess fluid to the by-pass reservoir.

14. A fuel unit comprising a pump casing including means defining a by-pass reservoir and first and second spaced apart fluid outlet chambers, means defining an inlet chamber in said casing, a driven shaft rotatably journaled in said casing, a pumping unit comprising a plurality of stacked plates mounted on said casing and including a plurality of pumping elements one of which is driven by said shaft, means for delivering inlet fluid from said inlet chamber to said pumping unit, means interconnecting the pumping unit and each of said outlet chambers, the plates of said pumping unit including ports and passages therein so disposed that the plates are capable of assembly in four different arrangements so that the outlet fluid may be delivered to said first fluid outlet chamber for one direction of drive of said shaft, to said first chamber for the opposite direction of drive of said shaft, to said second chamber for said one direction of drive of said shaft, or to said second chamber for said opposite direction of drive of the shaft, means defining a pair of spaced apart outlet openings respectively located adjacent said outlet chambers, pressure regulator mechanism extending between said outlet openings and through both of said outlet chambers and said by-pass reservoir communicating with said pressure regulator mechanism including separable parts one of which is effective to close one of the outlet openings and the other of which defines an outlet through the other of the outlet openings, said separable parts being capable of selective arrangement with respect to said outlet openings to deliver fluid from either of said outlet openings from its associated outlet chamber, said pressure regulating mechanism including means for by-passing excess outlet fluid to said by-pass reservoir.

15. The fuel unit defined by claim 1 wherein said pumping unit is a single-stage pumping device comprising a gear plate containing a pair of meshing pump gears one of which is mounted on said shaft and a cover plate having a pair of spaced apart fluid receiving pockets opening to said gears, said cover plate including a pair of spaced apart inlet passages therein, said gear plate including a fluid directing slot, a first through port located adjacent said slot and a second port remote from said slot, said slot connecting one of said inlet passages with different openings in said casing in the different arrangements of said plates in order to deliver inlet fluid into one of the outlet chambers from where it flows through another of the openings in said casing through the first port to one of said fluid pockets, is pressurized by said pump gears, delivered to the other of said pockets and then flows through the second port in said gear plate to the other of said chambers.

16. The fuel unit defined by claim 5 wherein said pumping unit is a single-stage pumping device comprising a gear plate containing a pair of meshing pump gears one of which is mounted on said shaft and a cover plate having a pair of spaced apart fluid receiving pockets opening to said gears, said cover plate including a pair of spaced apart inlet passages therein, said gear plate including a fluid directing slot, a first through port located adjacent said slot and a second port remote from said slot, said slot connecting one of said inlet passages with different openings in said casing in the different arrangements of said plates in order to deliver inlet fluid into one of the outlet chambers from where it flows through another of the openings in said casing through the first port to one of said fluid pockets, is pressurized by said pump gears, delivered to the other of said pockets and then flows through the second port in said gear plate to the other of said chambers.

17. The apparatus defined in claim 1 wherein said pumping unit is a multiple-stage pump including at least four stacked plates, two of which respectively contain first and second pairs of pumping elements with one element of each pair being driven by said shaft, the four plates of said unit including ports and passages so disposed that the plates may be selectively assembled in a first arrangement to deliver fluid from the first pair of pumping elements to one of said outlet chambers from where it flows to the suction side of the second pair of pumping elements so that said one chamber provides an interstage reservoir while the outlet of said second pair of pumping elements is delivered to the other of said chambers when the shaft is driven in a first direction, said plates in a second arrangement being capable of delivering fluid from the first pair of pumping elements to said one chamber so that the latter serves as the interstage bypass reservoir and said other chamber serves as the outlet chamber when the shaft is driven in the opposite direction, said plates in a third arrangement functioning to deliver fluid from the first pair of pumping elements to said other chamber from where it flows to the suction side of the second pair of pumping elements for pressurization and delivery to said one chamber, so that said other chamber functions as the interstage bypass reservoir when said shaft is driven in said first direction, said plates in a fourth arrangement functioning to deliver fluid from the first pair of pumping elements to said other outlet chamber from where it flows to the suction side of the second pair of pumping elements for pressurization when said shaft is driven in said opposite direction so that said other chamber functions as an interstage reservoir while the fluid from the second pair of pumping elements is delivered to said one chamber.

18. The apparatus defined by claim 5 wherein said pumping unit is a multiple-stage pump including at least four stacked plates, two of which respectively contain first and second pairs of pumping elements with one element of each pair being driven by said shaft, the four plates of said unit including ports and passages so disposed that the plates may be selectively assembled in a first arrangement to deliver fluid from the first pair of pumping elements to one of said outlet chambers from where it flows to the suction side of the second pair of pumping elements so that said one chamber provides an interstage reservoir while the outlet of said second pair of pumping elements is delivered to the other of said chambers when the shaft is driven in a first direction, said plates in a second arrangement delivering fluid from the first pair of pumping elements to said one chamber so that said one chamber serves as the interstage bypass reservoir and said other chamber serves as the outlet chamber when the shaft is driven in the opposite direction, said plates in a third arrangement functioning to deliver fluid from the first pair of pumping elements to said other chamber from where it flows to the suction side of the second pair of pumping elements for pressurization and delivery to said one chamber, so that said other chamber functions as the interstage bypass reservoir when said shaft is driven in said first direction, said plates in a fourth arrangement functioning to deliver fluid from the first pair of pumping elements to said other outlet chamber from where it flows to the suction side of the second pair of pumping elements for pressurization and delivery to said one outlet chamber, whereby said other chamber functions as an interstage reservoir when said shaft is driven in said opposite direction.

19. A multiple stage fuel unit comprising a pump casing including means defining first and second spaced apart chambers and a by-pass reservoir, a pumping unit comprising a first pump and a second pump mounted on said casing, an inlet delivering inlet fluid to said pumping unit, first fluid passage means delivering outlet fluid from said first pump to a first of said chambers, second fluid passage means connecting said first chamber to the inlet side of said second pump, third fluid passage means delivering outlet fluid from the second pump to the second of said chambers, and a pressure regulating mechanism secured to said casing and extending through said first and second chambers and through said bypass reservoir, said mechanism including means by-passing excess fluid from said second chamber to said by-pass reservoir, said pressure regulating mechanism also including means defining a continuously open fluid passage from the first chamber to the by-pass reservoir in order to bypass excess fluid from the first pump.

20. A multiple stage fuel unit comprising a pump casing including means defining an outlet and a by-pass reservoir, a pumping unit comprising a first pump and a second pump mounted on said casing, an inlet delivering inlet fluid to said pumping unit, first fluid passage means delivering outlet fluid from said first pump to the inlet side of said second pump, second fluid passage means delivering outlet fluid from the second pump to said outlet, and a pressure regulating mechanism secured to said casing and extending through said bypass reservoir and through said first and second chambers, said pressure regulating mechanism including means for by-passing excess fluid from said outlet to said by-pass reservoir, said pressure regulating mechanism also including means defining a continuously open fluid passage from the fluid passage means to the by-pass reservoir in order to bypass excess fluid from the first pump.

21. A multiple stage fuel unit comprising a pump casing including means defining first and second spaced apart openings, an outlet chamber, an intermediate chamber and a by-pass reservoir, a pumping unit comprising a first pump and a second pump mounted on said casing, an inlet delivering inlet fluid to said pumping unit, first fluid passage means delivering outlet fluid from said first pump to said intermediate chamber, and then to the inlet side of said second pump, second fluid passage means delivering outlet fluid from the second pump to said outlet chamber, a pressure regulating mechanism extending through the first and second chambers and through the bypass reservoir and including first and second elements secured within the first and second openings, respectively, means cooperating with said first element to by-pass excess fluid from said outlet chamber to said by-pass reservoir, and means cooperating with the second element to provide a continuously open fluid passage from the intermediate chamber to the by-pass reservoir in order to bypass excess fluid from the first pump.

22. A multiple stage fuel unit for use in a two-pipe system of the type having an inlet pipe and a return pipe comprising a hollow casing having means therein defining an inlet chamber adapted to be connected to the inlet pipe and a pair of aligned spaced apart openings, first and second internal partitions dividing said casing into an outlet chamber adjacent a first of said openings, an intermediate chamber adjacent the second of said openings, and a by-pass reservoir disposed between the outlet and intermediate chambers and adapted to be connected to the return pipe; structure defining first and second apertures in said first and second partitions, respectively, with both of said apertures being aligned with said openings; a pumping unit including first and second pumps mounted on said casing; a plurality of passage means providing fluid communication between said pumping unit and both said outlet and intermediate chambers; means for delivering inlet fluid from said inlet chamber to the pumping unit, said pumping unit comprising a plurality of stacked plates having ports and passages therein so arranged that inlet fluid flows to the inlet of the first pump, from the outlet of the first pump to said intermediate chamber and to the inlet of the second pump, and from the outlet of the second pump to the outlet chamber; and a pressure regulating mechanism including a valve sleeve extending through the first opening and into the first aperture, an outlet passageway in said valve sleeve, a first port in said sleeve connecting the outlet chamber to the interior of the sleeve, a fluid pressure responsive piston slidably mounted within said sleeve for controlling the flow of fluid through the outlet passageway, a second port in said valve sleeve opening to said by-pass reservoir and adapted to be uncovered by said piston to by-pass excess fluid, a valve plug secured within said second opening and having a portion extending through said second aperture, and means cooperating with said valve plug to provide a continuously open venting passage between said intermediate chamber and said by-pass reservoir.

23. A multiple stage fuel unit for use in a two-pipe system of the type having an inlet pipe and a return pipe comprising a hollow casing having means therein defining an inlet chamber adapted to be connected to the inlet pipe and a pair of aligned spaced apart openings; first and second internal partitions dividing said casing into an outlet chamber adjacent a first of said openings, an intermediate chamber adjacent the second of said openings, and a by-pass reservoir disposed between the outlet and intermediate chambers and adapted to be connected to the return pipe; structure defining first and second apertures in first and second partitions, respectively, with both of said apertures being aligned with said openings; a pumping unit including first and second pumps mounted on said casing; means providing fluid communication between said pumping unit and both said outlet and intermediate chambers; means for delivering fluid from said inlet chamber to said pumping unit, said pumping unit comprising a plurality of stacked plates having ports and passages therein so arranged that inlet fluid flows to the inlet of the first pump, from the outlet of the first pump to said intermediate chamber and to the inlet of the second pump, and from the outlet of the second pump to the outlet chamber; and a pressure regulating mechanism including a valve sleeve extending through the first opening and into the first aperture, an outlet passageway in said valve sleeve, a first port in said sleeve connecting the outlet chamber to the interior of the sleeve, a fluid pressure responsive piston slidably mounted within said sleeve for controlling the flow of fluid through the outlet passageway, a second port in said valve sleeve opening to said by-pass reservoir and adapted to be uncovered by said piston to by-pass excess fluid, a valve plug secured within said second opening and having an inwardly extending sleeve portion passing through said second aperture, a through passage in said sleeve portion connecting said intermediate chamber to the interior of said sleeve portion, a spring retaining cap in said sleeve portion, resilient means interposed between said cap and said piston to urge said piston in a direction to close said outlet passageway, said cap being shaped to cooperate with said sleeve portion to provide for fluid flow from the through passage in said sleeve portion to said by-pass reservoir in order to provide continuous venting.

24. A multiple stage fuel unit for use in a two-pipe system of the type having an inlet pipe and a return pipe comprising a hollow casing having means therein defining an inlet chamber adapted to be connected to the inlet pipe and a pair of aligned spaced apart openings; first and second internal partitions dividing said casing into an outlet chamber adjacent a first of said openings, an intermediate chamber adjacent the second of said openings, and a by-pass reservoir disposed between the outlet and intermediate chambers and adapted to be connected to the return pipe; structure defining first and second apertures in said first and second partitions, respectively, with both of said apertures being aligned with said openings; said casing having a wall exposed on its internal face to both said outlet chamber and said intermediate chamber; a pumping unit including first and second pumps mounted on the external face of said wall; first and second passages in said wall connecting said intermediate chamber to said pumping unit; a third passage in said wall connecting said outlet chamber to said pumping unit; means for delivering inlet fluid from said inlet chamber to the pumping unit, said pumping unit comprising a plurality of stacked plates having ports and passages therein so arranged that inlet fluid flows to the inlet of the first pump, from the outlet of the first pump through said first passage to said intermediate chamber, through said second passage to the inlet of the second pump, and from the outlet of the second pump through said third passage to the outlet chamber; and a pressure regulating mechanism including a valve sleeve extending through the first opening and into the first aperture, an outlet passageway in said valve sleeve, a first port in said sleeve connecting the outlet chamber to the interior of the sleeve, a fluid pressure responsive piston slidably mounted within said sleeve for controlling the flow of fluid through the outlet passageway, a second port in said valve sleeve opening to said by-pass reservoir and adapted to be uncovered by said piston to by-pass excess fluid, a valve plug secured within said second opening and having an inwardly extending sleeve portion passing through said second aperture, a through passage in said sleeve portion connecting said intermediate chamber to the interior of said sleeve portion, a spring retaining cap mounted in said sleeve portion, resilient means interposed between said cap and said piston to urge said piston towards said outlet passageway, said cap being shaped to cooperate with said sleeve portion to provide for fluid flow from the through passage in said portion to said by-pass reservoir in order to provide continuous venting, said plug having a threaded axial opening therein.

25. A multiple stage fuel unit for use in a two-pipe system of the type having an inlet pipe and a return pipe comprising a hollow casing having means therein defining an inlet chamber adapted to be connected to the inlet pipe and a pair of aligned spaced apart openings; first and second internal partitions dividing said casing into an outlet chamber adjacent a first of said openings, an intermediate chamber adjacent the second of said openings, and a by-pass reservoir disposed between the outlet and intermediate chambers and adapted to be connected to the return pipe; structure defining first and second apertures in said first and second partitions, respectively, with both of said apertures being aligned with said openings; said casing having a wall exposed on its internal face to both said outlet chamber and said intermediate chamber, a pumping unit including first and second pumps mounted on the external face of said wall; first and second passages in said wall connecting said intermediate chamber to said pumping unit; a third passage in said wall connecting said outlet chamber to said pumping unit; an end cover attached to said wall and cooperating with said pumping unit and said casing to define an inlet space; a passageway in said casing connecting said inlet chamber to said inlet space to deliver inlet fluid to the pumping unit, said pumping unit comprising a plurality of stacked plates having ports and passages therein so arranged that fluid flows from the inlet space to the first pump, from the outlet of said first pump through said first passage to said intermediate chamber, through said second passage to the inlet of the second pump, and from the outlet of said second pump through said third passage to the outlet chamber; and a pressure regulating mechanism including a valve sleeve extending through the first opening and into the first aperture, fluid sealing means disposed between said first partition and said valve sleeve, an outlet passageway in said valve sleeve, a first port in said sleeve connecting the outlet chamber to the interior of the sleeve, a fluid pressure responsive piston slidably mounted within said sleeve for controlling the flow of fluid through the outlet passageway, a second port in said valve sleeve opening to said by-pass reservoir and adapted to be uncovered by said piston to by-pass excess fluid, a valve plug secured within said second opening and having an inwardly extending sleeve portion passing through said second aperture, a through passage in said sleeve portion connecting said intermediate chamber to the interior of said sleeve portion, a spring retaining cap mounted in said sleeve portion, resilient means interposed between said cap and said piston to urge said piston towards said outlet passageway, said cap being shaped to cooperate with said sleeve portion to provide for fluid flow from the through passage in said portion to said by-pass reservoir in order to provide continuous venting, said plug having a threaded axial opening therein, and an adjusting screw accommodated within said threaded opening and having an end portion bearing against said cap, said screw being adjustable within said threaded opening to alter the pressure exerted by said resilient means on said piston and, hence, to control the pressure of the fluid delivered to said outlet passageway.

26. A multiple stage fuel unit comprising a pump casing including means defining first and second spaced apart chambers and a bypass reservoir, an outlet, a pumping unit mounted on said casing and comprising a first pump and a second pump, an inlet delivering inlet fluid to the first pump of said pumping unit, first fluid passage means delivering output fluid from said first pump to the first chamber and to the inlet of the second pump, second fluid passage means delivering fluid from the second pump to the second chamber, a pressure regulating mechanism secured to said casing and extending through both of said outlet chambers and through the bypass reservoir, said pressure regulating mechanism including means for delivering fluid from the second chamber to the outlet and for bypassing excess fluid from said second pump to said bypass reservoir, and said pressure regulating mechanism also including means defining a continuously open fluid passage from the first chamber to the bypass reservoir.

27. A fuel unit comprising a casing having means therein defining a bypass reservoir, said casing including a wall having an external pump receiving surface, a shaft journaled on said casing and extending through said reservoir and through an opening in said wall, a pumping unit mounted on said surface and operably connected to said shaft to be driven thereby, means defining first and second chambers in said casing located on opposed sides of the axis of said shaft and spaced from the bypass reservoir, means defining fluid passages in said wall for delivering fluid from the pumping unit to at least one of said chambers, first and second openings in opposed side walls of said casing respectively opening to said first and second chambers, a pressure regulating mechanism secured within said first and second openings and extending through said first and second chambers and through the bypass reservoir for bypassing excess fluid from said one chamber to the bypass reservoir, means defining an inlet chamber in each of said side walls, and means for delivering fluid from the inlet chambers to the pumping unit.

28. A fuel unit comprising a casing having means therein defining a bypass reservoir, said casing including a wall having an external pump receiving surface, a shaft journaled on said casing and extending through said reservoir and through an opening in said wall, a pumping unit mounted on said surface and operably connected to said shaft to be driven thereby, means defining first and second chambers in said casing located on opposed sides of the axis of said shaft and spaced from the bypass reservoir, means defining fluid passages in said wall for delivering fluid from the pumping unit to at least one of said chambers, first and second openings in opposed side walls of said casing respectively opening to said first and second chambers, and a pressure regulating mechanism secured within said first and second openings and extending through said first and second chambers and through the bypass reservoir for bypassing excess fluid from said one chamber to the bypass reservoir.

29. A pump housing comprising a hollow casing having an end wall with a flat external supporting surface, first and second spaced apart partitions extending generally perpendicular to said wall and dividing the interior of said casing to form a bypass reservoir and first and second chambers located on opposed sides of the reservoir, means defining first and second openings in opposed side walls of said casing respectively opening to the first and second chambers, means defining third and fourth openings in said first and second partitions, respectively, and in axial alignment with said first and second openings, a plurality of fluid passages in said end wall extending from said surface to said first and second chambers, first and second inlets in the opposed side walls of the casing, and fluid passages connecting said inlets to the external surface of said end wall.

30. A pump housing comprising a hollow casing having an end wall with a flat external supporting surface, first and second spaced apart partitions extending generally perpendicular to said wall and dividing the interior of said casing to form a bypass reservoir and first and second chambers located on opposed sides of the reservoir, means defining first and second openings in opposed side walls of said casing respectively opening to the first and second chambers, means defining third and fourth openings in said first and second partitions, respectively, and axially aligned with each other and with said first and second openings, and a plurality of fluid passages in said end wall extending from said surface to said first and second chambers.

References Cited in the file of this patent

UNITED STATES PATENTS

| | | |
|---|---|---|
| 2,107,152 | Huber | Feb. 1, 1938 |
| 2,233,709 | Osborne | Mar. 4, 1941 |
| 2,340,196 | Magrum et al. | Jan. 25, 1944 |
| 2,512,072 | Rystrom | June 20, 1950 |
| 2,621,598 | Jerome | Dec. 16, 1952 |
| 2,655,108 | Osborne | Oct. 13, 1953 |
| 2,708,879 | Van Meter | May 24, 1955 |
| 2,781,726 | Bangs | Feb. 19, 1957 |
| 2,790,391 | Holl | Apr. 30, 1957 |
| 2,794,398 | Munroe | June 4, 1957 |

UNITED STATES PATENT OFFICE

CERTIFICATION OF CORRECTION

Patent No. 2,966,118 December 27, 1960

John C. McAlvay

It is hereby certified that error appears in the above numbered patent requiring correction and that the said Letters Patent should read as corrected below.

Column 18, line 19, for "gear" read -- gears --; column 21, line 44, for "mecahnism" read -- mechanism --; column 22, line 12, for "assoicated" read -- associated --.

Signed and sealed this 27th day of June 1961.

(SEAL)
Attest:

ERNEST W. SWIDER
Attesting Officer

DAVID L. LADD
Commissioner of Patents